(12) United States Patent
Zhuang et al.

(10) Patent No.: US 11,922,290 B2
(45) Date of Patent: Mar. 5, 2024

(54) SYSTEM, METHOD, AND COMPUTER PROGRAM PRODUCT FOR ANALYZING MULTIVARIATE TIME SERIES USING A CONVOLUTIONAL FOURIER NETWORK

(71) Applicant: Visa International Service Association, San Francisco, CA (US)

(72) Inventors: Zhongfang Zhuang, San Jose, CA (US); Michael Yeh, Newark, CA (US); Wei Zhang, Fremont, CA (US); Mengting Gu, Stanford, CA (US); Yan Zheng, Los Gatos, CA (US); Liang Wang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/919,898

(22) PCT Filed: May 24, 2022

(86) PCT No.: PCT/US2022/030629
§ 371 (c)(1),
(2) Date: Oct. 19, 2022

(87) PCT Pub. No.: WO2022/251146
PCT Pub. Date: Dec. 1, 2022

(65) Prior Publication Data
US 2023/0143484 A1 May 11, 2023

Related U.S. Application Data

(60) Provisional application No. 63/192,259, filed on May 24, 2021.

(51) Int. Cl.
*G06N 3/0464* (2023.01)
*G06F 17/14* (2006.01)

(52) U.S. Cl.
CPC ......... *G06N 3/0464* (2023.01); *G06F 17/142* (2013.01)

(58) Field of Classification Search
CPC ........................... G06N 3/0464; G06F 17/142
See application file for complete search history.

(56) References Cited

U.S. PATENT DOCUMENTS

| | | |
|---|---|---|
| 2006/0010142 A1 | 1/2006 | Kim et al. |
| 2014/0074614 A1 | 3/2014 | Mehanian et al. |

(Continued)

FOREIGN PATENT DOCUMENTS

| | | |
|---|---|---|
| CN | 111709754 A | 9/2020 |
| CN | 112151059 A | 12/2020 |

OTHER PUBLICATIONS

Bahdanau et al., "Neural Machine Translation By Jointly Learning To Align And Translate", arXiv preprint arXiv:1409.0473, 2016, pp. 1-15.

(Continued)

*Primary Examiner* — Alexey Shmatov
*Assistant Examiner* — Robert Bejcek, II
(74) *Attorney, Agent, or Firm* — The Webb Law Firm

(57) ABSTRACT

Provided is a system for analyzing a multivariate time series that includes at least one processor programmed or configured to receive a time series of historical data points, determine a historical time period, determine a contemporary time period, determine a first time series of data points associated with a historical transaction metric from the historical time period, determine a second time series of data points associated with a historical target transaction metric from the historical time period, determine a third time series of data points associated with a contemporary transaction metric from the contemporary time period, and generate a machine learning model, wherein the machine learning model (Continued)

model is configured to provide an output that comprises a predicted time series of data points associated with a contemporary target transaction metric. Methods and computer program products are also provided.

14 Claims, 11 Drawing Sheets

(56) References Cited

U.S. PATENT DOCUMENTS

| | | | |
|---|---|---|---|
| 2014/0108314 A1 | 4/2014 | Chen et al. | |
| 2016/0063385 A1 | 3/2016 | Singh et al. | |
| 2017/0293269 A1* | 10/2017 | Sharma | G05B 13/028 |
| 2021/0089944 A1 | 3/2021 | Zhou et al. | |
| 2021/0406582 A1* | 12/2021 | Wang | G06F 18/214 |
| 2023/0027715 A1* | 1/2023 | Böhler | B60L 53/124 |

OTHER PUBLICATIONS

Box et al., "Time Series Analysis Forecasting and Control", John Wiley & Sons, 2015, 15 pp.
De Gooijer et al., "25 years of time series forecasting", International Journal of Forecasting, 2006, pp. 443-473, vol. 22.
Gama et al., "A Survey on Concept Drift Adaptation", ACM Computing Surveys, 2013, pp. 1-44, vol. 1, No. 1, Article 1.
Jin et al., "FFTNet: A Real-Time Speaker-Dependent Neural Vocoder", IEEE International Conference on Acoustics, Speech and Signal Processing (ICASSP), 2018, 5 pp.
Kapur et al., "Solving Merchant Attrition using Machine Learning", 2020, 9 pp., retrieved from https://medium.com/ @ODSC/solving-merchant-attrition-using-machine-learning-989e41e81b0e.
Kingma et al., "Adam: A Method For Stochastic Optimization", arXiv preprint arXiv:1412.6980, 2017, pp. 1-15.
Luong et al., "Effective Approaches To Attention-based Neural Machine Translation", arXiv preprint arXiv:1508.04025, 2015, 11 pp.
Mora, "Using ElasticSearch and Apache Spark to predict and monitor payment volumes", 2019, 11 pp., retrieved from https://www.adyen.com/blog/predicting-and-monitoring-payment-volumes-with-spark-and-elasticsearch.
Pearson, "Real-time Payments Analytics—Prediction", 7 pp., retrieved from https://www.ir.com/blog/payments/real-time-payments-analytics-prediction.
Quan et al., "Image Denoising Using Complex-Valued Deep CNN", Pattern Recognition, Oct. 10, 2020, pp. 1-32.
Sen et al., "Think Globally, Act Locally: A Deep Neural Network Approach To High-Dimensional Time Series Forecasting", 33rd Conference on Neural Information Processing Systems, 2019, pp. 1-10, Vancouver, Canada.
Shih et al., "Temporal pattern attention for multivariate time series forecasting", Machine Learning, 2019, pp. 1421-1441, vol. 108.
Thomas, "Atm Cash-Out: The Biggest Threat We Ignore", 2020, 7 pp., retrieved from https://medium.com/ @netsentries/atm-cash-out-the-biggest-threat-we-ignore-d0d4f3e50096.
Wen et al., "A Multi-Horizon Quantile Recurrent Forecaster", arXiv preprint arXiv:1711.11053, 2018, 9 pp.
Yeh et al., "Merchant Category Identification Using Credit Card Transactions", arXiv preprint arXiv:2011.02602, 2020, p pp.
Yeh et al., "Multi-future Merchant Transaction Prediction", arXiv preprint arXiv:2007.05303, 2020, pp. 1-16.
Zhuang et al., "Multi-stream RNN for Merchant Transaction Prediction", arXiv preprint arXiv:2008.01670, 2020, 7 pp.
Faloutsos et al., "Forecasting Big Time Series: Theory and Practice", In Proceedings of the 25th ACM SIGKDD International Conference on Knowledge Discovery & Data Mining, 2019, 309 pp.
Fan et al., "Multi-Horizon Time Series Forecasting with Temporal Attention Learning", In Proceedings of the 25th ACM SIGKDD International Conference on Knowledge Discovery & Data Mining, 2019, pp. 2527-2535.
Taieb et al., "A Bias and Variance Analysis for Multi-Step-Ahead Time Series Forecasting", IEEE Transactions on Neural Networks and Learning Systems, 2015, pp. 1-15.
Wong, "Time series forecasting using backpropagation neural networks", Neurocomputing 2, 1991, pp. 147-159.

* cited by examiner

SYSTEM, METHOD, AND COMPUTER PROGRAM PRODUCT FOR ANALYZING MULTIVARIATE TIME SERIES USING A CONVOLUTIONAL FOURIER NETWORK

CROSS REFERENCE TO RELATED APPLICATIONS

This application is the United States national phase of International Application No. PCT/US2022/030629 filed May 24, 2022, and claims priority to U.S. Provisional Patent Application No. 63/192,259, filed May 24, 2021, which are incorporated herein by reference in their entirety.

BACKGROUND

1. Technical Field

The present disclosure relates generally to systems, methods, and computer program products for predicting metrics using a machine learning model and, in non-limiting embodiments or aspects, to a system, method, and computer program product for predicting metrics using a machine learning model that includes a convolutional Fourier network.

2. Technical Considerations

Machine learning may be a field of computer science that uses statistical techniques to provide a computer system with the ability to learn (e.g., to progressively improve performance of) a task with data without the computer system being explicitly programmed to perform the task. In some instances, a machine learning model may be developed for a set of data so that the machine learning model may perform a task (e.g., a task associated with a prediction) with regard to the set of data.

In some instances, a machine learning model, such as a predictive machine learning model, may be used to make a prediction regarding a risk or an opportunity based on data. A predictive machine learning model may be used to analyze a relationship between the performance of a unit based on data associated with the unit and one or more known features of the unit. The objective of the predictive machine learning model may be to assess the likelihood that a similar unit will exhibit the performance of the unit. A predictive machine learning model may be used as a fraud detection model. For example, predictive machine learning models may perform calculations based on data associated with payment transactions to evaluate the risk or opportunity of a payment transaction involving a customer in order to guide a decision of whether to authorize the payment transaction.

A multivariate time series may refer to a time series that has more than one time-dependent variable. In some instances, in a multivariate time series, each time-dependent variable may depend not only on that time-dependent variable's past values, but also has some dependency on other time-dependent variables. The dependency may be used for forecasting future values of the time-dependent variable.

A payment processer may be an entity (e.g., a business entity, such as a corporation, a company, and/or the like) that enables payment transactions to be conducted between different parties (e.g., a consumer and a merchant) with reliability, convenience, and security. The payment processor may process (e.g., clear and/or settle) a payment transaction using a payment processing network. The payment processing network may include a network of communication equipment configured to allow communication between various parties (e.g., service providers, financial institutions, and/or account holders) so that payment transactions may be conducted.

Since an unexpected disruption of a payment processor's payment processing network could impair payment transactions that are enabled by the payment processer, the payment processor may actively monitor payment transactions (e.g., transaction data associated with payment transactions) with a predictive system using a predictive machine learning model that may take a multivariate time series as an input. In some instances, if certain aspects of transaction data (e.g., transaction volume and/or transaction amount) deviate from normal (e.g., predetermined levels) in different geographical regions, unexpected network outages may be able to be detected promptly. Further, suspicious activities, such as an automated teller machine (ATM) cash-out attack, may be detected based on determining that an abnormal transaction decline rate of an issuer system is taking place.

However, the latency of a payment processing network can cause a delay in the availability of transaction data for use with a predictive machine learning model. For example, some transaction data may be made available (e.g., via a process that aggregates transaction data) on an hourly basis, while other aspects of transaction data may not be available for much longer periods of time, for example, a period of days. If a prediction system may be required to wait for all transactions to be ready, then the prediction system may not keep up with the dynamics in real-time payment transactions. Moreover, external factors like economy, geopolitics, and/or a pandemic could abruptly change behaviors in payment transaction and subsequently cause a sudden concept drift, which may degrade the quality of a prediction made by the prediction system.

Further, there may be various transaction metrics used within the predictive system, and many of the applications mentioned above require the system to estimate time-varying patterns within transaction metrics. However, multivariate time-series transaction data alone may not be sufficient for making accurate predictions. It may be challenging for a predictive machine learning model to learn patterns from multiple incoming transaction metrics that are received simultaneously.

Additionally, when analyzing a multivariate time series, prediction techniques that are based on true values of time-dependent variables in the multivariate time series may be ineffective due to the nature of the multivariate time series, such as a multivariate time series that includes aspects of data associated with seasonality.

SUMMARY

Accordingly, provided are improved systems, devices, products, apparatus, and/or methods for predicting metrics using a convolutional Fourier network.

Further non-limiting embodiments or aspects are set forth in the following numbered clauses:

Clause 1: A system, comprising: at least one processor programmed or configured to: receive a time series of historical data points, wherein the data points include values of a plurality of transaction features with regard to a plurality of time intervals during an initial time period; determine a historical time period, wherein the historical time period comprises a first time period of the initial time period; determine a contemporary time period, wherein the contemporary time period comprises a second time period of the initial time period that is after the historical time period, wherein the historical time period is longer than the contemporary time period; determine a first time series of data points associated with a historical transaction metric from the historical time period; determine a second time series of data points associated with a historical target transaction metric from the historical time period; determine a third time series of data points associated with a contemporary transaction metric from the contemporary time period; generate a machine learning model, wherein the machine learning model is configured to provide an output that comprises a predicted time series of data points associated with a contemporary target transaction metric, wherein, when generating the machine learning model, the at least one processor is programmed or configured to: train the machine learning model based on the first time series of data points associated with the historical transaction metric, the second time series of data points associated with the historical target transaction metric, and the third time series of data points associated with the contemporary transaction metric; and generate an output of the machine learning model, wherein the output of the machine learning model comprises the contemporary target transaction metric, and wherein the contemporary target transaction metric comprises a value of a target transaction metric during a targeted prediction period.

Clause 2: The system of clause 1, wherein, when training the machine learning model, the at least one processor is programmed or configured to: provide the first time series of data points associated with the historical transaction metric, the second time series of data points associated with the historical target transaction metric, and the third time series of data points associated with the contemporary transaction metric as inputs to a processing layer of the machine learning model, wherein the processing layer comprises a fast Fourier transform (FFT) layer; provide an output of the processing layer as an input to a feature extraction component of the machine learning model; provide an output of the feature extraction component of the machine learning model as an input to a dual-attention component of the machine learning model; and provide an output of the dual-attention component of the machine learning model as an input to a learning and prediction component of the machine learning model.

Clause 3: The system of clause 1 or 2, wherein, when providing the first time series of data points associated with the historical transaction metric, the second time series of data points associated with the historical target transaction metric, and the third time series of data points associated with the contemporary transaction metric as inputs to the processing layer of the machine learning model, the at least one processor is programmed or configured to: provide each feature of a first plurality of features of the first time series of data points associated with the historical transaction metric as an input to the FFT layer to generate a real part and an imaginary part for each feature of the first plurality of features; provide each feature of a second plurality of features of the second time series of data points associated with the historical target transaction metric as an input to the FFT layer to generate a real part and an imaginary part for each feature of the second plurality of features; and provide each feature of a third plurality of features of the third time series of data points associated with the contemporary transaction metric as an input to the FFT layer to generate a real part and an imaginary part for each feature of the third plurality of features.

Clause 4: The system of any of clauses 1-3, wherein, when training the machine learning model, the at least one processor is programmed or configured to: combine the real part for each feature of the first plurality of features to generate a combined real part of the first plurality of features; combine the imaginary part for each feature of the first plurality of features to generate a combined imaginary part of the first plurality of features; combine the real part for each feature of the second plurality of features to generate a combined real part of the second plurality of features; combine the imaginary part for each feature of the second plurality of features to generate a combined imaginary part of the second plurality of features; combine the real part for each feature of the third plurality of features to generate a combined real part of the third plurality of features; and combine the imaginary part for each feature of the third plurality of features to generate a combined imaginary part of the third plurality of features; and wherein the output of the processing layer of the machine learning model comprises the combined real part of the first plurality of features, the combined imaginary part of the first plurality of features, the combined real part of the second plurality of features, the combined imaginary part of the second plurality of features, the combined real part of the third plurality of features, and the combined imaginary part of the third plurality of features.

Clause 5: The system of any of clauses 1-4, wherein, when training the machine learning model, the at least one processor is programmed or configured to: provide the combined real part of the first plurality of features as an input to a one-dimensional feature extraction convolutional layer; provide the combined imaginary part of the first plurality of features as an input to the one-dimensional feature extraction convolutional layer; provide the combined real part of the second plurality of features as an input to the one-dimensional feature extraction convolutional layer; provide the combined imaginary part of the second plurality of features as an input to the one-dimensional feature extraction convolutional layer; provide the combined real part of the third plurality of features as an input to the one-dimensional feature extraction convolutional layer; provide the combined imaginary part of the third plurality of features as an input to the one-dimensional feature extraction convolutional layer; and generate the output of the feature extraction component of the machine learning model based on an output of the one-dimensional feature extraction convolutional layer.

Clause 6: The system of any of clauses 1-5, wherein the input to the dual-attention component of the machine learning model comprises a real input portion and an imaginary input portion, wherein the real input portion comprises: a first real input based on an output of the one-dimensional feature extraction convolutional layer for the combined real part of the first plurality of features; a second real input based on an output of the one-dimensional feature extraction convolutional layer for the combined real part of the second plurality of features; and a third real input based on an output of the one-dimensional feature extraction convolutional layer for the combined real part of the third plurality of features; and wherein the imaginary input portion comprises: a first imaginary input based on an output of the one-dimensional feature extraction convolutional layer for the combined imaginary part of the first plurality of features; a second imaginary input based on an output of the one-dimensional feature extraction convolutional layer for the combined imaginary part of the second plurality of features; and a third imaginary input based on an output of the one-dimensional feature extraction convolutional layer for the combined imaginary part of the third plurality of features; and wherein, when training the machine learning model, the at least one processor is programmed or configured to: generate a real component attention matrix based on the real input portion, wherein the real component attention matrix has a number of attention vectors that is equal to a number of features of the plurality of transaction features; and generate an imaginary component attention matrix based on the imaginary input portion, wherein the imaginary component attention matrix has a number of attention vectors that is equal to a number of features of the plurality of transaction features.

Clause 7: The system of any of clauses 1-6, wherein the at least one processor is further programmed or configured to: generate the real input portion of the input to the dual-attention component of the machine learning model; and generate the imaginary input portion of the input to the dual-attention component of the machine learning model; wherein, when generating the real input portion of the input to the dual-attention component of the machine learning model, the at least one processor is programmed or configured to: provide the output of the one-dimensional feature extraction convolutional layer for the combined real part of the first plurality of features as an input to a dropout layer to generate a real contemporary transaction metric feature vector as the first real input; provide the output of the one-dimensional feature extraction convolutional layer for the combined real part of the second plurality of features as an input to the dropout layer to generate a real historical transaction metric feature vector as the second real input; and provide the output of the one-dimensional feature extraction convolutional layer for the combined real part of the third plurality of features as an input to the dropout layer to generate a real historical target transaction metric feature vector as the third real input; and wherein, when generating the imaginary input portion of the input to the dual-attention component of the machine learning model, the at least one processor is programmed or configured to: provide the output of the one-dimensional feature extraction convolutional layer for the combined imaginary part of the first plurality of features as an input to the dropout layer to generate an imaginary contemporary transaction metric feature vector as the first imaginary input; provide the output of the one-dimensional feature extraction convolutional layer for the combined imaginary part of the second plurality of features as an input to the dropout layer to generate an imaginary historical transaction metric feature vector as the second imaginary input; and provide the output of the one-dimensional feature extraction convolutional layer for the combined imaginary part of the third plurality of features as an input to the dropout layer to generate an imaginary historical target transaction metric feature vector as the third imaginary input.

Clause 8: The system of any of clauses 1-7, wherein, when generating the real component attention matrix, the at least one processor is programmed or configured to: generate a dot product of the real contemporary transaction metric feature vector and the real historical transaction metric feature vector; provide the dot product of the real contemporary transaction metric feature vector and the real historical transaction metric feature vector as an input to a softmax layer to generate a real attention feature vector; and generate a dot product of the real attention feature vector and the real historical target transaction metric feature vector to generate the real component attention matrix; wherein, when generating the imaginary component attention matrix, the at least one processor is programmed or configured to: generate a dot product of the imaginary contemporary transaction metric feature vector and the imaginary historical transaction metric feature vector; provide the dot product of the imaginary contemporary transaction metric feature vector and the imaginary historical transaction metric feature vector as a input to a softmax layer to generate an imaginary attention feature vector; and generate a dot product of the imaginary attention feature vector and the imaginary historical target transaction metric feature vector to generate the imaginary component attention matrix.

Clause 9: The system of any of clauses 1-8, wherein, when generating the real component attention matrix, the at least one processor is programmed or configured to: perform an addition function on the real contemporary transaction metric feature vector and the real historical transaction metric feature vector; provide the result of the addition function of the real contemporary transaction metric feature vector and the real historical transaction metric feature vector as an input to a tanh activation function; provide an output of the tanh activation function as a input to a softmax layer to generate a real attention feature vector; and generate a dot product of the real attention feature vector and the real historical target transaction metric feature vector to generate the real component attention matrix; wherein, when generating the imaginary component attention matrix, the at least one processor is programmed or configured to: perform an addition function on the imaginary contemporary transaction metric feature vector and the imaginary historical transaction metric feature vector; provide the result of the addition function of the imaginary contemporary transaction metric feature vector and the imaginary historical transaction metric feature vector as an input to a tanh activation function; provide an output of the tanh activation function as a input to a softmax layer to generate an imaginary attention feature vector; and generate a dot product of the imaginary attention feature vector and the imaginary historical target transaction metric feature vector to generate the imaginary component attention matrix.

Clause 10: The system of any of clauses 1-9, wherein, when providing the output of the dual-attention component of the machine learning model as the input to the learning and prediction component of the machine learning model, the at least one processor is programmed or configured to: concatenate the real component attention matrix and the real contemporary transaction metric feature vector to generate a first concatenation; provide the first concatenation as an input to a feature learning one-dimensional convolutional layer; concatenate the imaginary component attention matrix and the imaginary contemporary transaction metric feature vector to generate a second concatenation; provide the second concatenation as an input to the feature learning one-dimensional convolutional layer; provide an input to a reshape layer based on an output of the feature learning one-dimensional convolutional layer for the first concatenation to generate a real component feature vector; and provide an input to the reshape layer based on an output of the feature learning one-dimensional convolutional layer for the second concatenation to generate an imaginary component feature vector.

Clause 11: The system of any of clauses 1-10, wherein, when generating the output of the machine learning model, the at least one processor is programmed or configured to: generate a complex number feature vector based on the real component feature vector and the imaginary component feature vector; and provide the complex number feature vector as an input to an inverse FFT layer to generate the contemporary target transaction metric.

Clause 12: A method, comprising: receiving, with at least one processor, a time series of historical data points, wherein the data points include values of a plurality of transaction features with regard to a plurality of time intervals during an initial time period; determining, with at least one processor, a historical time period, wherein the historical time period comprises a first time period of the initial time period; determining, with at least one processor, a contemporary time period, wherein the contemporary time period comprises a second time period of the initial time period that is after the historical time period, wherein the historical time period is longer than the contemporary time period; determining, with at least one processor, a first time series of data points associated with a historical transaction metric from the historical time period; determining, with at least one processor, a second time series of data points associated with a historical target transaction metric from the historical time period; determining, with at least one processor, a third time series of data points associated with a contemporary transaction metric from the contemporary time period; generating, with at least one processor, a machine learning model, wherein the machine learning model is configured to provide an output that comprises a predicted time series of data points associated with a contemporary target transaction metric, wherein generating the machine learning model comprises: training the machine learning model based on the first time series of data points associated with the historical transaction metric, the second time series of data points associated with the historical target transaction metric, and the third time series of data points associated with the contemporary transaction metric; and generating an output of the machine learning model, wherein the output of the machine learning model comprises the contemporary target transaction metric, and wherein the contemporary target transaction metric comprises a value of a target transaction metric during a targeted prediction period.

Clause 13: The method of clause 12, wherein training the machine learning model comprises: providing the first time series of data points associated with the historical transaction metric, the second time series of data points associated with the historical target transaction metric, and the third time series of data points associated with the contemporary transaction metric as inputs to a processing layer of the machine learning model, wherein the processing layer comprises a fast Fourier transform (FFT) layer; providing an output of the processing layer as an input to a feature extraction component of the machine learning model; providing an output of the feature extraction component of the machine learning model as an input to a dual-attention component of the machine learning model; and providing an output of the dual-attention component of the machine learning model as an input to a learning and prediction component of the machine learning model.

Clause 14: The method of clause 12 or 13, wherein providing the first time series of data points associated with the historical transaction metric, the second time series of data points associated with the historical target transaction metric, and the third time series of data points associated with the contemporary transaction metric as inputs to the processing layer of the machine learning model comprises: providing each feature of a first plurality of features of the first time series of data points associated with the historical transaction metric as an input to the FFT layer to generate a real part and an imaginary part for each feature of the first plurality of features; providing each feature of a second plurality of features of the second time series of data points associated with the historical target transaction metric as an input to the FFT layer to generate a real part and an imaginary part for each feature of the second plurality of features; and providing each feature of a third plurality of features of the third time series of data points associated with the contemporary transaction metric as an input to the FFT layer to generate a real part and an imaginary part for each feature of the third plurality of features.

Clause 15: The method of any of clauses 12-14, wherein training the machine learning model comprises: combining the real part for each feature of the first plurality of features to generate a combined real part of the first plurality of features; combining the imaginary part for each feature of the first plurality of features to generate a combined imaginary part of the first plurality of features; combining the real part for each feature of the second plurality of features to generate a combined real part of the second plurality of features; combining the imaginary part for each feature of the second plurality of features to generate a combined imaginary part of the second plurality of features; combining the real part for each feature of the third plurality of features to generate a combined real part of the third plurality of features; and combining the imaginary part for each feature of the third plurality of features to generate a combined imaginary part of the third plurality of features; and wherein the output of the processing layer of the machine learning model comprises the combined real part of the first plurality of features, the combined imaginary part of the first plurality of features, the combined real part of the second plurality of features, the combined imaginary part of the second plurality of features, the combined real part of the third plurality of features, and the combined imaginary part of the third plurality of features.

Clause 16: The method of any of clauses 12-15, wherein training the machine learning model comprises: providing the combined real part of the first plurality of features as an input to a one-dimensional feature extraction convolutional layer; providing the combined imaginary part of the first plurality of features as an input to the one-dimensional feature extraction convolutional layer; providing the combined real part of the second plurality of features as an input to the one-dimensional feature extraction convolutional layer; providing the combined imaginary part of the second plurality of features as an input to the one-dimensional feature extraction convolutional layer; providing the combined real part of the third plurality of features as an input to the one-dimensional feature extraction convolutional layer; providing the combined imaginary part of the third plurality of features as an input to the one-dimensional feature extraction convolutional layer; and generating the output of the feature extraction component of the machine learning model based on an output of the one-dimensional feature extraction convolutional layer.

Clause 17: The method of any of clauses 12-16, wherein the input to the dual-attention component of the machine learning model comprises a real input portion and an imaginary input portion, wherein the real input portion comprises: a first real input based on an output of the one-dimensional feature extraction convolutional layer for the combined real part of the first plurality of features; a second real input based on an output of the one-dimensional feature extraction convolutional layer for the combined real part of the second plurality of features; and a third real input based on an output of the one-dimensional feature extraction convolutional layer for the combined real part of the third plurality of features; and wherein the imaginary input portion comprises: a first imaginary input based on an output of the one-dimensional feature extraction convolutional layer for the combined imaginary part of the first plurality of features; a second imaginary input based on an output of the one-dimensional feature extraction convolutional layer for the combined imaginary part of the second plurality of features; and a third imaginary input based on an output of the one-dimensional feature extraction convolutional layer for the combined imaginary part of the third plurality of features; and wherein training the machine learning model comprises: generating a real component attention matrix based on the real input portion, wherein the real component attention matrix has a number of attention vectors that is equal to a number of features of the plurality of transaction features; and generating an imaginary component attention matrix based on the imaginary input portion, wherein the imaginary component attention matrix has a number of attention vectors that is equal to a number of features of the plurality of transaction features.

Clause 18: The method of any of clauses 12-17, wherein the method further comprises: generating the real input portion of the input to the dual-attention component of the machine learning model; and generating the imaginary input portion of the input to the dual-attention component of the machine learning model; wherein generating the real input portion of the input to the dual-attention component of the machine learning model comprises: providing the output of the one-dimensional feature extraction convolutional layer for the combined real part of the first plurality of features as an input to a dropout layer to generate a real contemporary transaction metric feature vector as the first real input; providing the output of the one-dimensional feature extraction convolutional layer for the combined real part of the second plurality of features as an input to the dropout layer to generate a real historical transaction metric feature vector as the second real input; and providing the output of the one-dimensional feature extraction convolutional layer for the combined real part of the third plurality of features as an input to the dropout layer to generate a real historical target transaction metric feature vector as the third real input; and wherein generating the imaginary input portion of the input to the dual-attention component of the machine learning model comprises: providing the output of the one-dimensional feature extraction convolutional layer for the combined imaginary part of the first plurality of features as an input to the dropout layer to generate an imaginary contemporary transaction metric feature vector as the first imaginary input; providing the output of the one-dimensional feature extraction convolutional layer for the combined imaginary part of the second plurality of features as an input to the dropout layer to generate an imaginary historical transaction metric feature vector as the second imaginary input; and providing the output of the one-dimensional feature extraction convolutional layer for the combined imaginary part of the third plurality of features as an input to the dropout layer to generate an imaginary historical target transaction metric feature vector as the third imaginary input.

Clause 19: The method of any of clauses 12-18, wherein generating the real component attention matrix comprises: generating a dot product of the real contemporary transaction metric feature vector and the real historical transaction metric feature vector; providing the dot product of the real contemporary transaction metric feature vector and the real historical transaction metric feature vector as an input to a softmax layer to generate a real attention feature vector; and generating a dot product of the real attention feature vector and the real historical target transaction metric feature vector to generate the real component attention matrix; wherein generating the imaginary component attention matrix comprises: generating a dot product of the imaginary contemporary transaction metric feature vector and the imaginary historical transaction metric feature vector; providing the dot product of the imaginary contemporary transaction metric feature vector and the imaginary historical transaction metric feature vector as a input to a softmax layer to generate an imaginary attention feature vector; and generating a dot product of the imaginary attention feature vector and the imaginary historical target transaction metric feature vector to generate the imaginary component attention matrix.

Clause 20: The method of any of clauses 12-19, wherein generating the real component attention matrix comprises: performing an addition function on the real contemporary transaction metric feature vector and the real historical transaction metric feature vector; providing the result of the addition function of the real contemporary transaction metric feature vector and the real historical transaction metric feature vector as an input to a tanh activation function; providing an output of the tanh activation function as a input to a softmax layer to generate a real attention feature vector; and generating a dot product of the real attention feature vector and the real historical target transaction metric feature vector to generate the real component attention matrix; wherein generating the imaginary component attention matrix comprises: performing an addition function on the imaginary contemporary transaction metric feature vector and the imaginary historical transaction metric feature vector; providing the result of the addition function of the imaginary contemporary transaction metric feature vector and the imaginary historical transaction metric feature vector as an input to a tanh activation function; providing an output of the tanh activation function as a input to a softmax layer to generate an imaginary attention feature vector; and generating a dot product of the imaginary attention feature vector and the imaginary historical target transaction metric feature vector to generate the imaginary component attention matrix.

Clause 21: The method of any of clauses 12-20, wherein providing the output of the dual-attention component of the machine learning model as the input to the learning and prediction component of the machine learning model comprises: concatenating the real component attention matrix and the real contemporary transaction metric feature vector to generate a first concatenation; providing the first concatenation as an input to a feature learning one-dimensional convolutional layer; concatenating the imaginary component attention matrix and the imaginary contemporary transaction metric feature vector to generate a second concatenation; providing the second concatenation as an input to the feature learning one-dimensional convolutional layer; providing an input to a reshape layer based on an output of the feature learning one-dimensional convolutional layer for the first concatenation to generate a real component feature vector; and providing an input to the reshape layer based on an output of the feature learning one-dimensional convolutional layer for the second concatenation to generate an imaginary component feature vector.

Clause 22: The method of any of clauses 12-21, wherein generating the output of the machine learning model comprises: generating a complex number feature vector based on the real component feature vector and the imaginary component feature vector; and providing the complex number feature vector as an input to an inverse FFT layer to generate the contemporary target transaction metric.

Clause 23: A computer program product comprising at least one non-transitory computer-readable medium including one or more instructions that, when executed by at least one processor, cause the at least one processor to: receive a time series of historical data points, wherein the data points include values of a plurality of transaction features with regard to a plurality of time intervals during an initial time period; determine a historical time period, wherein the historical time period comprises a first time period of the initial time period; determine a contemporary time period, wherein the contemporary time period comprises a second time period of the initial time period that is after the historical time period, wherein the historical time period is longer than the contemporary time period; determine a first time series of data points associated with a historical transaction metric from the historical time period; determine a second time series of data points associated with a historical target transaction metric from the historical time period; determine a third time series of data points associated with a contemporary transaction metric from the contemporary time period; generate a machine learning model, wherein the machine learning model is configured to provide an output that comprises a predicted time series of data points associated with a contemporary target transaction metric, wherein, the one or more instructions that cause the at least one processor to generate the machine learning model, cause the at least one processor to: train the machine learning model based on the first time series of data points associated with the historical transaction metric, the second time series of data points associated with the historical target transaction metric, and the third time series of data points associated with the contemporary transaction metric; and generate an output of the machine learning model, wherein the output of the machine learning model comprises the contemporary target transaction metric, and wherein the contemporary target transaction metric comprises a value of a target transaction metric during a targeted prediction period.

Clause 24: The computer program product of clause 23, wherein, the one or more instructions that cause the at least one processor to train the machine learning model, cause the at least one processor to: provide the first time series of data points associated with the historical transaction metric, the second time series of data points associated with the historical target transaction metric, and the third time series of data points associated with the contemporary transaction metric as inputs to a processing layer of the machine learning model, wherein the processing layer comprises a fast Fourier transform (FFT) layer; provide an output of the processing layer as an input to a feature extraction component of the machine learning model; provide an output of the feature extraction component of the machine learning model as an input to a dual-attention component of the machine learning model; and provide an output of the dual-attention component of the machine learning model as an input to a learning and prediction component of the machine learning model.

Clause 25: The computer program product of clause 23 or 24, wherein, the one or more instructions that cause the at least one processor to provide the first time series of data points associated with the historical transaction metric, the second time series of data points associated with the historical target transaction metric, and the third time series of data points associated with the contemporary transaction metric as inputs to the processing layer of the machine learning model, cause the at least one processor to: provide each feature of a first plurality of features of the first time series of data points associated with the historical transaction metric as an input to the FFT layer to generate a real part and an imaginary part for each feature of the first plurality of features; provide each feature of a second plurality of features of the second time series of data points associated with the historical target transaction metric as an input to the FFT layer to generate a real part and an imaginary part for each feature of the second plurality of features; and provide each feature of a third plurality of features of the third time series of data points associated with the contemporary transaction metric as an input to the FFT layer to generate a real part and an imaginary part for each feature of the third plurality of features.

Clause 26: The computer program product of any of clauses 23-25, wherein, the one or more instructions that cause the at least one processor to train the machine learning model, cause the at least one processor to: combine the real part for each feature of the first plurality of features to generate a combined real part of the first plurality of features; combine the imaginary part for each feature of the first plurality of features to generate a combined imaginary part of the first plurality of features; combine the real part for each feature of the second plurality of features to generate a combined real part of the second plurality of features; combine the imaginary part for each feature of the second plurality of features to generate a combined imaginary part of the second plurality of features; combine the real part for each feature of the third plurality of features to generate a combined real part of the third plurality of features; and combine the imaginary part for each feature of the third plurality of features to generate a combined imaginary part of the third plurality of features; and wherein the output of the processing layer of the machine learning model comprises the combined real part of the first plurality of features, the combined imaginary part of the first plurality of features, the combined real part of the second plurality of features, the combined imaginary part of the second plurality of features, the combined real part of the third plurality of features, and the combined imaginary part of the third plurality of features.

Clause 27: The computer program product of any of clauses 23-26, wherein, the one or more instructions that cause the at least one processor to train the machine learning model, cause the at least one processor to: provide the combined real part of the first plurality of features as an input to a one-dimensional feature extraction convolutional layer; provide the combined imaginary part of the first plurality of features as an input to the one-dimensional feature extraction convolutional layer; provide the combined real part of the second plurality of features as an input to the one-dimensional feature extraction convolutional layer; provide the combined imaginary part of the second plurality of features as an input to the one-dimensional feature extraction convolutional layer; provide the combined real part of the third plurality of features as an input to the one-dimensional feature extraction convolutional layer; provide the combined imaginary part of the third plurality of features as an input to the one-dimensional feature extraction convolutional layer; and generate the output of the feature extraction component of the machine learning model based on an output of the one-dimensional feature extraction convolutional layer.

Clause 28: The computer program product of any of clauses 23-27, wherein the input to the dual-attention component of the machine learning model comprises a real input portion and an imaginary input portion, wherein the real input portion comprises: a first real input based on an output of the one-dimensional feature extraction convolutional layer for the combined real part of the first plurality of features; a second real input based on an output of the one-dimensional feature extraction convolutional layer for the combined real part of the second plurality of features;

and a third real input based on an output of the one-dimensional feature extraction convolutional layer for the combined real part of the third plurality of features; and wherein the imaginary input portion comprises: a first imaginary input based on an output of the one-dimensional feature extraction convolutional layer for the combined imaginary part of the first plurality of features; a second imaginary input based on an output of the one-dimensional feature extraction convolutional layer for the combined imaginary part of the second plurality of features; and a third imaginary input based on an output of the one-dimensional feature extraction convolutional layer for the combined imaginary part of the third plurality of features; and wherein, the one or more instructions that cause the at least one processor to train the machine learning model, cause the at least one processor to: generate a real component attention matrix based on the real input portion, wherein the real component attention matrix has a number of attention vectors that is equal to a number of features of the plurality of transaction features; and generate an imaginary component attention matrix based on the imaginary input portion, wherein the imaginary component attention matrix has a number of attention vectors that is equal to a number of features of the plurality of transaction features.

Clause 29: The computer program product of any of clauses 23-28, wherein the one or more instructions further cause the at least one processor to: generate the real input portion of the input to the dual-attention component of the machine learning model; and generate the imaginary input portion of the input to the dual-attention component of the machine learning model; wherein, the one or more instructions that cause the at least one processor to generate the real input portion of the input to the dual-attention component of the machine learning model, cause the at least one processor to: provide the output of the one-dimensional feature extraction convolutional layer for the combined real part of the first plurality of features as an input to a dropout layer to generate a real contemporary transaction metric feature vector as the first real input; provide the output of the one-dimensional feature extraction convolutional layer for the combined real part of the second plurality of features as an input to the dropout layer to generate a real historical transaction metric feature vector as the second real input; and provide the output of the one-dimensional feature extraction convolutional layer for the combined real part of the third plurality of features as an input to the dropout layer to generate a real historical target transaction metric feature vector as the third real input; and wherein, the one or more instructions that cause the at least one processor to generate the imaginary input portion of the input to the dual-attention component of the machine learning model, cause the at least one processor to: provide the output of the one-dimensional feature extraction convolutional layer for the combined imaginary part of the first plurality of features as an input to the dropout layer to generate an imaginary contemporary transaction metric feature vector as the first imaginary input; provide the output of the one-dimensional feature extraction convolutional layer for the combined imaginary part of the second plurality of features as an input to the dropout layer to generate an imaginary historical transaction metric feature vector as the second imaginary input; and provide the output of the one-dimensional feature extraction convolutional layer for the combined imaginary part of the third plurality of features as an input to the dropout layer to generate an imaginary historical target transaction metric feature vector as the third imaginary input.

Clause 30: The computer program product of any of clauses 23-29, wherein, the one or more instructions that cause the at least one processor to generate the real component attention matrix, cause the at least one processor to: generate a dot product of the real contemporary transaction metric feature vector and the real historical transaction metric feature vector; provide the dot product of the real contemporary transaction metric feature vector and the real historical transaction metric feature vector as an input to a softmax layer to generate a real attention feature vector; and generate a dot product of the real attention feature vector and the real historical target transaction metric feature vector to generate the real component attention matrix; wherein, the one or more instructions that cause the at least one processor to generate the imaginary component attention matrix, cause the at least one processor to: generate a dot product of the imaginary contemporary transaction metric feature vector and the imaginary historical transaction metric feature vector; provide the dot product of the imaginary contemporary transaction metric feature vector and the imaginary historical transaction metric feature vector as a input to a softmax layer to generate an imaginary attention feature vector; and generate a dot product of the imaginary attention feature vector and the imaginary historical target transaction metric feature vector to generate the imaginary component attention matrix.

Clause 31: The computer program product of any of clauses 23-30, wherein, the one or more instructions that cause the at least one processor to generate the real component attention matrix, cause the at least one processor to: perform an addition function on the real contemporary transaction metric feature vector and the real historical transaction metric feature vector; provide the result of the addition function of the real contemporary transaction metric feature vector and the real historical transaction metric feature vector as an input to a tanh activation function; provide an output of the tanh activation function as a input to a softmax layer to generate a real attention feature vector; and generate a dot product of the real attention feature vector and the real historical target transaction metric feature vector to generate the real component attention matrix; wherein, the one or more instructions that cause the at least one processor to generate the imaginary component attention matrix, cause the at least one processor to: perform an addition function on the imaginary contemporary transaction metric feature vector and the imaginary historical transaction metric feature vector; provide the result of the addition function of the imaginary contemporary transaction metric feature vector and the imaginary historical transaction metric feature vector as an input to a tanh activation function; provide an output of the tanh activation function as a input to a softmax layer to generate an imaginary attention feature vector; and generate a dot product of the imaginary attention feature vector and the imaginary historical target transaction metric feature vector to generate the imaginary component attention matrix.

Clause 32: The computer program product of any of clauses 23-31, wherein, the one or more instructions that cause the at least one processor to provide the output of the dual-attention component of the machine learning model as the input to the learning and prediction component of the machine learning model, cause the at least one processor to: concatenate the real component attention matrix and the real contemporary transaction metric feature vector to generate a first concatenation; provide the first concatenation as an input to a feature learning one-dimensional convolutional layer; concatenate the imaginary component attention matrix and the imaginary contemporary transaction metric feature vector to generate a second concatenation; provide the second concatenation as an input to the feature learning one-dimensional convolutional layer; provide an input to a reshape layer based on an output of the feature learning one-dimensional convolutional layer for the first concatenation to generate a real component feature vector; and provide an input to the reshape layer based on an output of the feature learning one-dimensional convolutional layer for the second concatenation to generate an imaginary component feature vector.

Clause 33: The computer program product of any of clauses 23-32, wherein, the one or more instructions that cause the at least one processor to generate the output of the machine learning model, the at least one processor is programmed or configured to: generate a complex number feature vector based on the real component feature vector and the imaginary component feature vector; and provide the complex number feature vector as an input to an inverse FFT layer to generate the contemporary target transaction metric.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
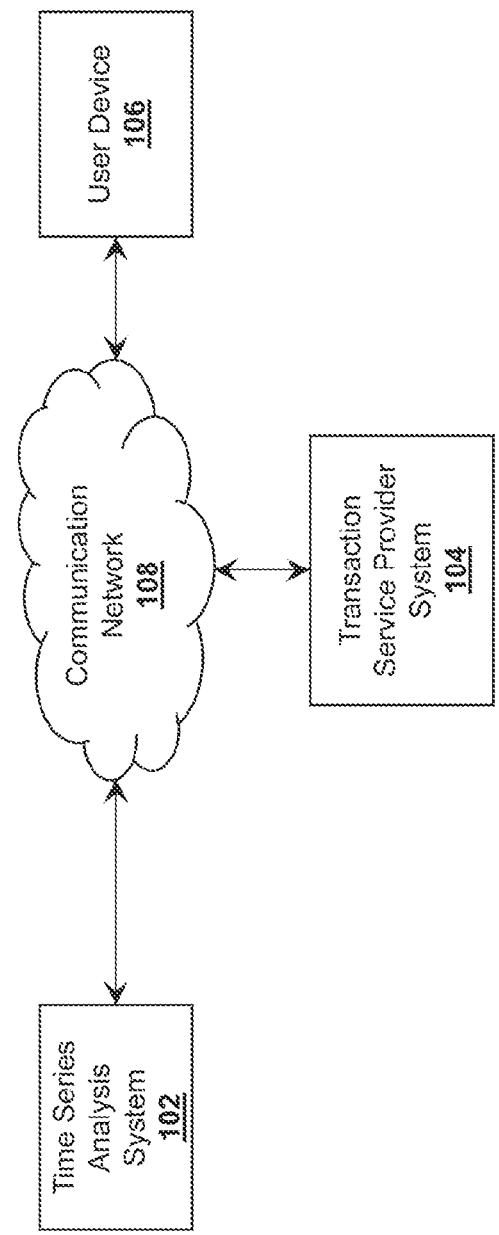
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of electronic payment devices managed by a transaction service provider. As used herein, the term "payment gateway system" may refer to one or more computer systems, computer devices, servers, groups of servers, and/or the like operated by or on behalf of a payment gateway.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for predicting metrics using a convolutional Fourier network. In some non-limiting embodiments or aspects, a system for estimating a transaction metric during a time interval may include at least one processor programmed or configured to receive a time series of historical data points, wherein the data points include values of a plurality of transaction features with regard to a plurality of time intervals during an initial time period, determine a historical time period, wherein the historical time period comprises a first time period of the initial time period, determine a contemporary time period, wherein the contemporary time period comprises a second time period of the initial time period that is after the historical time period, and wherein the historical time period is longer than the contemporary time period. In some non-limiting embodiments or aspects, the at least one processor may be programmed or configured to determine a first time series of data points associated with a historical transaction metric from the historical time period, determine a second time series of data points associated with a historical target transaction metric from the historical time period, determine a third time series of data points associated with a contemporary transaction metric from the contemporary time period, and generate a machine learning model.

In some non-limiting embodiments or aspects, the machine learning model is configured to provide an output that comprises a predicted time series of data points associated with a contemporary target transaction metric. In some non-limiting embodiments or aspects, when generating the machine learning model, the at least one processor is programmed or configured to train the machine learning model based on the first time series of data points associated with the historical transaction metric, the second time series of data points associated with the historical target transaction metric, and the third time series of data points associated with the contemporary transaction metric. In some non-limiting embodiments or aspects, when training the machine learning model, the at least one processor is programmed or configured to provide the first time series of data points associated with the historical transaction metric, the second time series of data points associated with the historical target transaction metric, and the third time series of data points associated with the contemporary transaction metric as inputs to a feature extraction component of the machine learning model, provide an output of the feature extraction component of the machine learning model as an input to a dual-attention component of the machine learning model, provide an output of the dual-attention component of the machine learning model as an input to a learning and prediction component of the machine learning model, and generate an output of the learning and prediction component of the machine learning model, wherein the output of the prediction component of the machine learning model comprises the contemporary target transaction metric, and wherein the contemporary target transaction metric comprises a value of a target transaction metric during a targeted prediction period.

In this way, and with the use of a Fourier transform and/or an inverse Fourier transform as a convolution Fourier network, the system may provide for ability to process data in light of the latency involved in a payment processing network, such as a delay in the availability of transaction data for use with the machine learning model. In addition, the system may be robust and able to provide accurate results when analyzing factors that may change behaviors in payment transactions and cause concept drift. Further, the system may be able to accurately analyze a multivariate time series based on the ability to analyze aspects, including seasonality aspects, that are specific to data associated with data in a multivariate time series.

Referring now to FIG. 1, FIG. 1 is a diagram of an example environment 100 in which devices, systems, and/or methods, described herein, may be implemented. As shown in FIG. 1, environment 100 includes time series analysis system 102, transaction service provider system 104, user device 106, and communication network 108. Time series analysis system 102, transaction service provider system 104, and/or user device 106 may interconnect (e.g., establish a connection to communicate) via wired connections, wireless connections, or a combination of wired and wireless connections.

Time series analysis system 102 may include one or more devices configured to communicate with transaction service provider system 104 and/or user device 106 via communication network 108. For example, time series analysis system 102 may include a server, a group of servers, and/or other like devices. In some non-limiting embodiments or aspects, time series analysis system 102 may be associated with transaction service provider system 104, as described herein. Additionally or alternatively, time series analysis system 102 may generate (e.g., train, validate, retrain, and/or the like), store, and/or implement (e.g., operate. provide inputs to and/or outputs from, and/or the like) one or more machine learning models. In some non-limiting embodiments or aspects, time series analysis system 102 may be in communication with a data storage device, which may be local or remote to time series analysis system 102. In some non-limiting embodiments or aspects, time series analysis system 102 may be capable of receiving information from, storing information in, transmitting information to, and/or searching information stored in the data storage device.

Transaction service provider system 104 may include one or more devices configured to communicate with time series analysis system 102 and/or user device 106 via communication network 108. For example, transaction service provider system 104 may include a computing device, such as a server, a group of servers, and/or other like devices. In some non-limiting embodiments or aspects, transaction service provider system 104 may be associated with a transaction service provider as discussed herein. In some non-limiting embodiments or aspects, time series analysis system 102 may be a component of transaction service provider system 104.

User device 106 may include a computing device configured to communicate with time series analysis system 102 and/or transaction service provider system 104 via communication network 108. For example, user device 106 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, user device 106 may be associated with a user (e.g., an individual operating user device 106).

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
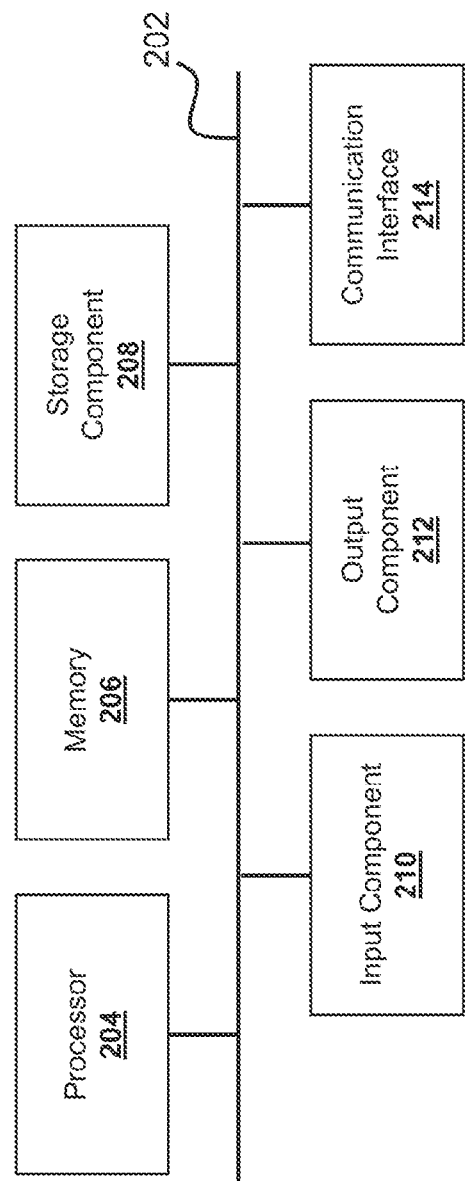
FIG. 2 is a diagram of a non-limiting embodiment or aspect of components of one or more devices of FIG. 1.

Referring now to FIG. 2, FIG. 2 is a diagram of example components of a device 200. Device 200 may correspond to time series analysis system 102 (e.g., one or more devices of time series analysis system 102), transaction service provider system 104 (e.g., one or more devices of transaction service provider system 104), and/or user device 106. In some non-limiting embodiments or aspects, time series analysis system 102, transaction service provider system 104, and/or user device 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
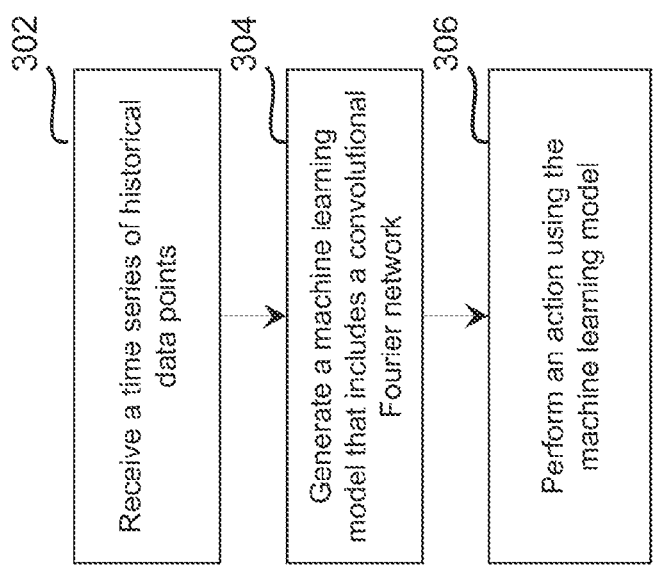
FIG. 3 is a flowchart of a non-limiting embodiment or aspect of a process for analyzing a multivariate time series using a machine learning model that includes a convolutional Fourier network.

Referring now to FIG. 3, FIG. 3 is a flowchart of a non-limiting embodiment or aspect of a process 300 for analyzing a multivariate time series using a machine learning model that includes a convolutional Fourier network. In some non-limiting embodiments or aspects, one or more of the steps of process 300 may be performed (e.g., completely, partially, etc.) by time series analysis system 102 (e.g., one or more devices of time series analysis system 102). In some non-limiting embodiments or aspects, one or more of the steps of process 300 may be performed (e.g., completely, partially, etc.) by another device or a group of devices separate from or including time series analysis system 102 (e.g., one or more devices of time series analysis system 102), transaction service provider system 104 (e.g., one or more devices of transaction service provider system 104), and/or user device 106.

As shown in FIG. 3, at step 302, process 300 includes receiving a time series of historical data points. For example, time series analysis system 102 may receive the time series of historical data points from transaction service provider system 104. In some non-limiting embodiments or aspects, the time series of historical data points may include data (e.g., transaction data) associated with historical payment transactions that were conducted using one or more payment processing networks (e.g., one or more payment processing networks associated with transaction service provider system 104).

In some non-limiting embodiments or aspects, the time series of historical data points may include a multivariate time series. In some non-limiting embodiments or aspects, a multivariate time series may be a series of values that is based on a plurality of time-dependent variables, where each variable depends on that variable's past values and also has a dependency based on the other time-dependent variables of the plurality of time-dependent variables.

As shown in FIG. 3, at step 304, process 300 includes generating a machine learning model that includes a convolutional Fourier network. For example, time series analysis system 102 may generate the machine learning model that includes a convolutional Fourier network based on the time series of historical data points. In some non-limiting embodiments or aspects, time series analysis system 102 may generate the machine learning model by training the machine learning model based on a portion of the time series of historical data points and validating the machine learning model based on another portion of the time series of historical data points. In some non-limiting embodiments or aspects, the machine learning model may be configured to provide an output that comprises a predicted time series of data points associated with a contemporary target transaction metric.

As shown in FIG. 3, at step 306, process 300 includes performing an action using the machine learning model. For example, time series analysis system 102 may perform the action using the machine learning model. In some non-limiting embodiments or aspects, time series analysis system 102 may generate a prediction using the machine learning model. For example, time series analysis system 102 may receive an input (e.g., a real-time input) and generate an output of the machine learning model based on the input. In some non-limiting embodiments or aspects, the output may include the prediction. In some non-limiting embodiments or aspects, the prediction may include one or more future transaction metrics (e.g., one or more contemporary target transaction metrics) associated with one or more entities based on historical transaction behaviors of the one or more entities.

Figure 4:
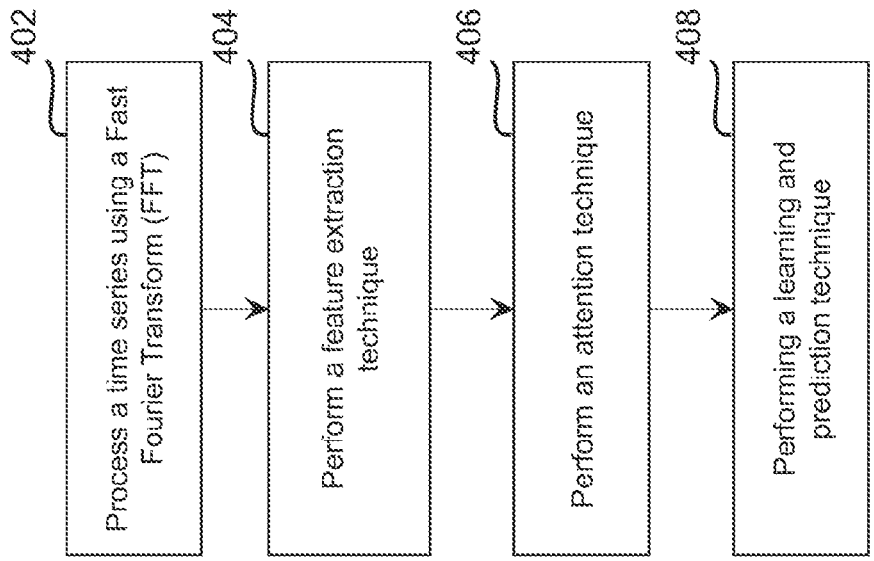
FIG. 4 is a flowchart of a non-limiting embodiment or aspect of a process for generating a machine learning model that includes a convolutional Fourier network.

Referring now to FIG. 4, FIG. 4 is a flowchart of a non-limiting embodiment or aspect of a process 400 for generating a machine learning model that includes a convolutional Fourier network (e.g., in the same or similar way as step 304 of process 300). In some non-limiting embodiments or aspects, one or more of the steps of process 400 may be performed (e.g., completely, partially, etc.) by time series analysis system 102 (e.g., one or more devices of time series analysis system 102). In some non-limiting embodiments or aspects, one or more of the steps of process 400 may be performed (e.g., completely, partially, etc.) by another device or a group of devices separate from or including time series analysis system 102 (e.g., one or more devices of time series analysis system 102), transaction service provider system 104 (e.g., one or more devices of transaction service provider system 104), and/or user device 106.

As further shown in FIG. 4, at step 402, process 400 includes processing a time series using a Fast Fourier Transform (FFT). For example, time series analysis system 102 may process the time series using the FFT. In some non-limiting embodiments or aspects, time series analysis system 102 may process the time series using a discrete Fourier Transform, such as a real-valued FFT (RFFT). In this way, by using the RFFT, time series analysis system 102 may determine distinct patterns in the time series based on results of the RFFT. This may be particularly true for a time series that has patterns during a time interval (e.g., sub-period) of an overall time period, such as for seasonal patterns in the time series.

In some non-limiting embodiments or aspects, time series analysis system 102 may receive a time series of historical data points. In some non-limiting embodiments or aspects, the data points may include values of a plurality of transaction features (e.g., transaction features of data associated with a plurality of historical payment transactions involving one or more entities, such as values of transaction metrics associated with the plurality of historical payment transactions, measurements of transaction metrics associated with the plurality of historical payment transactions, etc.) with regard to a plurality of time intervals during an initial time period. In some non-limiting embodiments or aspects, time series analysis system 102 may determine a historical time period that includes a first time period of the initial time period, and determine a contemporary time period that includes a second time period of the initial time period that is after the historical time period. In some non-limiting embodiments or aspects, the historical time period may be longer than the contemporary time period. Additionally or alternatively, the historical time period and the contemporary time period may be separated by an amount of time within the initial time period. For example, the historical time period and the contemporary time period may be separated by a gap of time that includes the amount of time within the initial time period.

In some non-limiting embodiments or aspects, time series analysis system 102 may determine a first time series of data points associated with a historical transaction metric from the historical time period, determine a second time series of data points associated with a historical target transaction metric from the historical time period, and/or determine a third time series of data points associated with a contemporary transaction metric from the contemporary time period.

In some non-limiting embodiments or aspects, time series analysis system 102 may train the machine learning model based on the first time series of data points associated with the historical transaction metric, the second time series of data points associated with the historical target transaction metric, and/or the third time series of data points associated with the contemporary transaction metric. In some non-limiting embodiments or aspects, time series analysis system 102 may train the machine learning model by providing the first time series of data points associated with the historical transaction metric, the second time series of data points associated with the historical target transaction metric, and the third time series of data points associated with the contemporary transaction metric as inputs to a processing layer. In some non-limiting embodiments or aspects, the processing layer may include the RFFT layer.

In some non-limiting embodiments or aspects, when providing the first time series of data points associated with the historical transaction metric, the second time series of data points associated with the historical target transaction metric, and the third time series of data points associated with the contemporary transaction metric as inputs to the processing layer of the input machine learning model, time series analysis system 102 may provide each feature of a first plurality of features of the first time series of data points associated with the historical transaction metric as an input to the RFFT layer to generate a real part and an imaginary part for each feature of the first plurality of features. Additionally or alternatively, time series analysis system 102 may provide each feature of a second plurality of features of the second time series of data points associated with the historical target transaction metric as an input to the RFFT layer to generate a real part and an imaginary part for each feature of the second plurality of features. Additionally or alternatively, time series analysis system 102 may provide each feature of a third plurality of features of the third time series of data points associated with the contemporary transaction metric as an input to the RFFT layer to generate a real part and an imaginary part for each feature of the third plurality of features.

In some non-limiting embodiments or aspects, time series analysis system 102 may combine the real part for each feature of the first plurality of features to generate a combined real part of the first plurality of features, combine the imaginary part for each feature of the first plurality of features to generate a combined imaginary part of the first plurality of features, combine the real part for each feature of the second plurality of features to generate a combined real part of the second plurality of features, combine the imaginary part for each feature of the second plurality of features to generate a combined imaginary part of the second plurality of features, combine the real part for each feature of the third plurality of features to generate a combined real part of the third plurality of features, and/or combine the imaginary part for each feature of the third plurality of features to generate a combined imaginary part of the third plurality of features. In some non-limiting embodiments or aspects, the output of the processing layer of the machine learning model may include the combined real part of the first plurality of features, the combined imaginary part of the first plurality of features, the combined real part of the second plurality of features, the combined imaginary part of the second plurality of features, the combined real part of the third plurality of features, and the combined imaginary part of the third plurality of features.

As further shown in FIG. 4, at step 404, process 400 includes performing a feature extraction technique. For example, time series analysis system 102 may perform the feature extraction technique on an output of the processing layer of the machine learning model. In some non-limiting embodiments or aspects, time series analysis system 102 may provide the output of the processing layer as an input to a feature extraction component of the machine learning model. In some non-limiting embodiments or aspects, time series analysis system 102 may provide the combined real part of the first plurality of features as an input to a one-dimensional feature extraction convolutional layer, provide the combined imaginary part of the first plurality of features as an input to the one-dimensional feature extraction convolutional layer, provide the combined real part of the second plurality of features as an input to the one-dimensional feature extraction convolutional layer, provide the combined imaginary part of the second plurality of features as an input to the one-dimensional feature extraction convolutional layer, provide the combined real part of the third plurality of features as an input to the one-dimensional feature extraction convolutional layer, and/or provide the combined imaginary part of the third plurality of features as an input to the one-dimensional feature extraction convolutional layer.

In some non-limiting embodiments or aspects, time series analysis system 102 may provide the output of the one-dimensional feature extraction convolutional layer for the combined real part of the first plurality of features as an input to a dropout layer to generate a real contemporary transaction metric feature vector, provide the output of the one-dimensional feature extraction convolutional layer for the combined real part of the second plurality of features as an input to the dropout layer to generate a real historical transaction metric feature vector, provide the output of the one-dimensional feature extraction convolutional layer for the combined real part of the third plurality of features as an input to the dropout layer to generate a real historical target transaction metric feature vector, provide the output of the one-dimensional feature extraction convolutional layer for the combined imaginary part of the first plurality of features as an input to the dropout layer to generate an imaginary contemporary transaction metric feature vector, provide the output of the one-dimensional feature extraction convolutional layer for the combined imaginary part of the second plurality of features as an input to the dropout layer to generate an imaginary historical transaction metric feature vector, and/or provide the output of the one-dimensional feature extraction convolutional layer for the combined imaginary part of the third plurality of features as an input to the dropout layer to generate an imaginary historical target transaction metric feature vector.

In some non-limiting embodiments or aspects, time series analysis system 102 may generate the output of the feature extraction component of the machine learning model based on an output of the one-dimensional feature extraction convolutional layer. In some non-limiting embodiments or aspects, the output of the feature extraction component of the machine learning model may include the real contemporary transaction metric feature vector, the real historical transaction metric feature vector, the real historical target transaction metric feature vector, the imaginary contemporary transaction metric feature vector, the imaginary historical transaction metric feature vector, and/or the imaginary historical target transaction metric feature vector.

As further shown in FIG. 4, at step 406, process 400 includes performing an attention technique. For example, time series analysis system 102 may perform the attention technique. In some non-limiting embodiments or aspects, time series analysis system 102 may provide an output of the feature extraction component of the machine learning model as an input to a dual-attention component of the machine learning model. In some non-limiting embodiments or aspects, the input to the dual-attention component of the machine learning model includes a real input portion and an imaginary input portion. In some non-limiting embodiments or aspects, the real input portion includes a first real input based on an output of the one-dimensional feature extraction convolutional layer for the combined real part of the first plurality of features, a second real input based on an output of the one-dimensional feature extraction convolutional layer for the combined real part of the second plurality of features, and/or a third real input based on an output of the one-dimensional feature extraction convolutional layer for the combined real part of the third plurality of features. In some non-limiting embodiments or aspects, the imaginary input portion includes a first imaginary input based on an output of the one-dimensional feature extraction convolutional layer for the combined imaginary part of the first plurality of features, a second imaginary input based on an output of the one-dimensional feature extraction convolutional layer for the combined imaginary part of the second plurality of features, and/or a third imaginary input based on an output of the one-dimensional feature extraction convolutional layer for the combined imaginary part of the third plurality of features.

In some non-limiting embodiments or aspects, time series analysis system 102 may generate a real component attention matrix based on the real input portion and/or generate an imaginary component attention matrix based on the imaginary input portion. In some non-limiting embodiments or aspects, the first attention matrix has a number of attention vectors that is equal to a number of features of the plurality of transaction features. In some non-limiting embodiments or aspects, the second attention matrix has a number of attention vectors that is equal to a number of features of the plurality of transaction features.

In some non-limiting embodiments or aspects, time series analysis system 102 may generate the real input portion of the input to the dual-attention component of the machine learning model and/or generate the imaginary input portion of the input to the dual-attention component of the machine learning model. In some non-limiting embodiments or aspects, when generating the real input portion of the input to the dual-attention component of the machine learning model, time series analysis system 102 may provide the output of the one-dimensional feature extraction convolutional layer for the combined real part of the first plurality of features as an input to a dropout layer to generate a real contemporary transaction metric feature vector as the first real input, provide the output of the one-dimensional feature extraction convolutional layer for the combined real part of the second plurality of features as an input to the dropout layer to generate a real historical transaction metric feature vector as the second real input, and/or provide the output of the one-dimensional feature extraction convolutional layer for the combined real part of the third plurality of features as an input to the dropout layer to generate a real historical target transaction metric feature vector as the third real input. In some non-limiting embodiments or aspects, when generating the imaginary input portion of the input to the dual-attention component of the machine learning model, time series analysis system 102 may provide the output of the one-dimensional feature extraction convolutional layer for the combined imaginary part of the first plurality of features as an input to the dropout layer to generate an imaginary contemporary transaction metric feature vector as the first imaginary input, provide the output of the one-dimensional feature extraction convolutional layer for the combined imaginary part of the second plurality of features as an input to the dropout layer to generate an imaginary historical transaction metric feature vector as the second imaginary input, and/or provide the output of the one-dimensional feature extraction convolutional layer for the combined imaginary part of the third plurality of features as an input to the dropout layer to generate an imaginary historical target transaction metric feature vector as the third imaginary input.

In some non-limiting embodiments or aspects, when generating the first attention matrix, time series analysis system 102 may generate a dot product of the real contemporary transaction metric feature vector and the real historical transaction metric feature vector, provide the dot product of the real contemporary transaction metric feature vector and the real historical transaction metric feature vector as an input to a softmax layer to generate a real attention feature vector, and/or generate a dot product of the real attention feature vector and the real historical target transaction metric feature vector to generate the real component attention matrix.

In some non-limiting embodiments or aspects, when generating the first attention matrix, time series analysis system 102 may perform an addition function on the real contemporary transaction metric feature vector and the real historical transaction metric feature vector, provide the result of the addition function of the real contemporary transaction metric feature vector and the real historical transaction metric feature vector as an input to a tanh activation function, provide an output of the tanh activation function as an input to a softmax layer to generate a real attention feature vector, and/or generate a dot product of the real attention feature vector and the real historical target transaction metric feature vector to generate the real component attention matrix.

In some non-limiting embodiments or aspects, when generating the second attention matrix, time series analysis system 102 may generate a dot product of the imaginary contemporary transaction metric feature vector and the imaginary historical transaction metric feature vector, provide the dot product of the imaginary contemporary transaction metric feature vector and the imaginary historical transaction metric feature vector as an input to a softmax layer to generate an imaginary attention feature vector, and/or generate a dot product of the imaginary attention feature vector and the imaginary historical target transaction metric feature vector to generate the imaginary component attention matrix.

In some non-limiting embodiments or aspects, when generating the second attention matrix, time series analysis system 102 may perform an addition function on the imaginary contemporary transaction metric feature vector and the imaginary historical transaction metric feature vector, provide the result of the addition function of the imaginary contemporary transaction metric feature vector and the imaginary historical transaction metric feature vector as an input to a tanh activation function, provide an output of the tanh activation function as an input to a softmax layer to generate an imaginary attention feature vector, and/or generate a dot product of the imaginary attention feature vector and the imaginary historical target transaction metric feature vector to generate the imaginary component attention matrix.

As further shown in FIG. 4, at step 408, process 400 includes performing a learning and prediction technique. For example, time series analysis system 102 may perform the learning and prediction technique. In some non-limiting embodiments or aspects, time series analysis system 102 may provide an output of the dual-attention component of the machine learning model as an input to a learning and prediction component of the machine learning model. In some non-limiting embodiments or aspects, time series analysis system 102 may concatenate the first attention matrix and the real contemporary transaction metric feature vector to generate a first concatenation and provide the first concatenation as an input to a feature learning one-dimensional convolutional layer. In some non-limiting embodiments or aspects, time series analysis system 102 may concatenate the second attention matrix and the imaginary contemporary transaction metric feature vector to generate a second concatenation and provide the second concatenation as an input to the feature learning one-dimensional convolutional layer.

In some non-limiting embodiments or aspects, time series analysis system 102 may provide an input to a reshape layer based on an output of the feature learning one-dimensional convolutional layer for the first concatenation to generate a real component feature vector and/or provide an input to the reshape layer based on an output of the feature learning one-dimensional convolutional layer for the second concatenation to generate an imaginary component feature vector.

In some non-limiting embodiments or aspects, time series analysis system 102 may generate an output of the learning and prediction component of the machine learning model. The output of the prediction component of the machine learning model may include the contemporary target transaction metric, and the contemporary target transaction metric may include a value of a target transaction metric during a targeted prediction period. In some non-limiting embodiments or aspects, time series analysis system 102 may generate a complex number feature vector based on the real component feature vector and the imaginary component feature vector and provide the complex number feature vector as an input to an inverse RFFT layer to generate the contemporary target transaction metric.

Referring now to FIGS. 5A-5E, illustrated are non-limiting embodiments or aspects of machine learning model architecture 500 and components of machine learning model architecture 500 for implementing a process (e.g., process 300) for analyzing a multivariate time series using a machine learning model that includes a convolutional Fourier network or a process (e.g., process 400) for generating a machine learning model that includes a convolutional Fourier network.

Figure 5A:
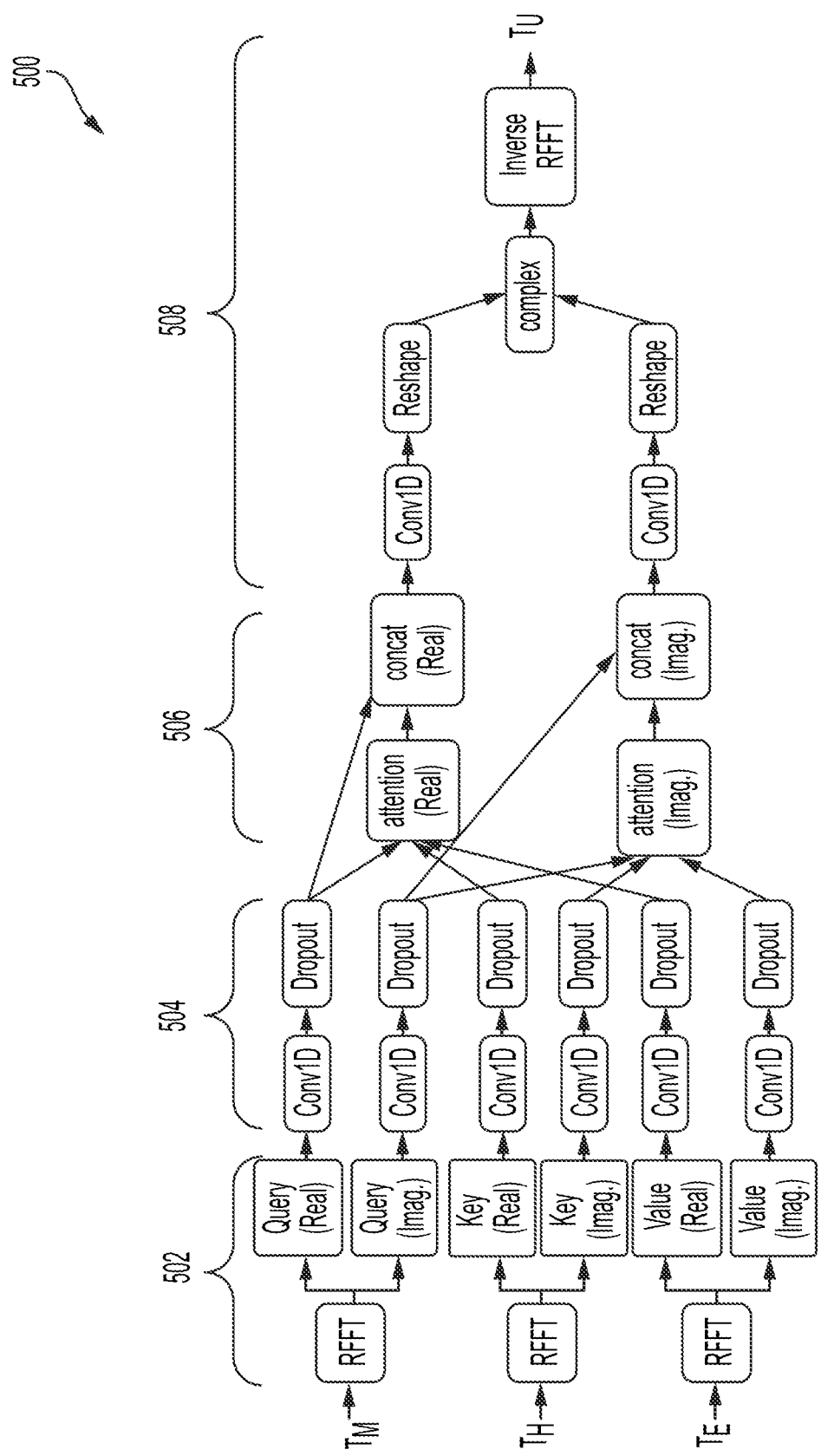
FIGS. 5A-5E are diagrams of non-limiting embodiments or aspects of a machine learning model architecture for analyzing a multivariate time series.

As shown in FIG. 5A, machine learning model architecture 500 may include processing layer 502, feature extraction component 504, dual-attention component 506, and learning and prediction component 508. As further shown in FIG. 5A, inputs to processing layer 502 may include a time series for a contemporary transaction metric, $T_M$, a time series for a historical transaction metric, $T_H$, and a time series for a historical target transaction metric, $T_E$. As further shown in FIG. 5A, an output of learning and prediction component 508 may include a time series for the contemporary target transaction metric, $T_U$. Through the use of a Fourier transaction (e.g., an RFFT), machine learning model architecture 500 is a machine learning model that includes a convolutional Fourier network. Accordingly, machine learning model architecture 500 involves the principle that multiplication in the frequency domain corresponds to convolution in the time domain.

In some non-limiting embodiments or aspects, the time series contemporary transaction metric, INA, may include a multivariate time series $T_M \in R_C^T \times f$, where $T_C$ is the length of the multivariate time series and f is the number of features included in the multivariate time series. In some non-limiting embodiments or aspects, at the m-th time, the value of the n-th feature may be denoted as $T_{M_{n,n}}$. In one example, the contemporary transaction metric may include a series of transaction metrics for one year that includes 14 features, where r is 8,760, since there are 8,760 hours in a year, and the value of f is 14, representing the number of features (e.g., the number of transaction metrics) used.

In some non-limiting embodiments or aspects, the time series of contemporary target transaction metric, $T_U$, may include a uni-variate time series $T_U \in R_C^T$, where $T_C$ is the length of the uni-variate time series. In some non-limiting embodiments or aspects, the time series of historical transaction metric, $T_H$, may include a multivariate time series $T_H \in R_h^T \times f$, where $T_h$ is the length of the multivariate time series and f is the number of features included in the multivariate time series. In some non-limiting embodiments or aspects, the time series of the historical target transaction metric, $T_E$, may include a uni-variate time series $T_E \in R_h^T \times f$, where $T_h$ is the length of the time series. In some non-limiting embodiments or aspects, for each time step in the time series of historical transaction metric, $T_H$, there may be a corresponding (e.g., one-to-one mapping to) time step in the time series of the historical target transaction metric, $T_E$.

In some non-limiting embodiments or aspects, the time series for all of the transaction metrics $T_M$, $T_U$, $T_H$, and $T_E$, may be considered as two individual pairs, where the contemporary transaction metric, $T_M$, and the contemporary target transaction metric, $T_U$, form a first pair, and the historical transaction metric, $T_H$, and historical target transaction metric, $T_E$, form a second pair. For all four transaction metrics, T[i:j] may be used to denote a series (e.g., a sub-series of an overall series) beginning and ending at the i-th and the j-th data points (e.g., timestamps).

In some non-limiting embodiments, a gap of time, g, may be provided between a beginning of a time series of the contemporary transaction metric and an end of a time series of the historical transaction metric. In one example, the beginning of the time series of the contemporary transaction metric is s, and the beginning of the time series of the historical transaction metric may be described by the formula: $s-g-T_h$.

In some non-limiting embodiments or aspects, the time series for the contemporary transaction metric, $T_M$, and the time series for the contemporary target transaction metric, $T_U$, may have the same length. In some non-limiting embodiments or aspects, a length of each time series may be based on the sampling rate for the time series. In one example, if $T_M$ and $T_U$ have the same sampling rate, $T_M$ and $T_U$ may have the same length. In some non-limiting embodiments or aspects, the time series for the historical transaction metric, $T_H$, and/or the time series for the historical target transaction metric, $T_E$, may have a length that is different than $T_M$ and/or $T_U$, since more historical data points may be used in attention layers when compared to $T_M$ and/or $T_U$.

Figure 5B:
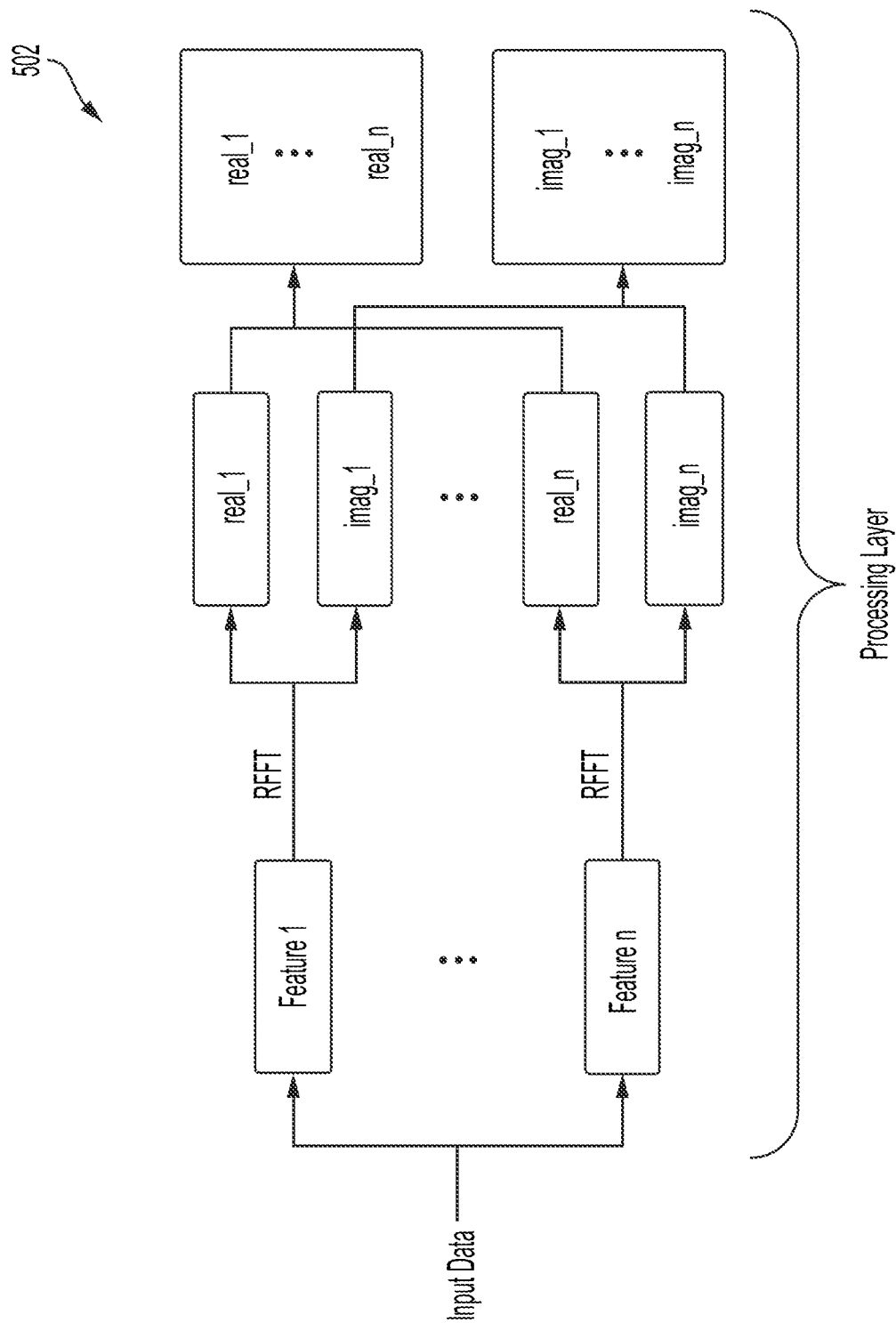

As shown in FIG. 5B, processing layer 502 may include an RFFT layer. As further shown in FIG. 5B, inputs to processing layer 502 may include input data (e.g., features of a time series of data points associated with a contemporary transaction metric, $T_M$, features of a time series of data points associated with a historical transaction metric, $T_H$, and/or features of a time series of data points associated with a historical target transaction metric, $T_E$). In some non-limiting embodiments or aspects, time series analysis system 102 may provide the input data to processing layer 502. In some non-limiting embodiments or aspects, time series analysis system 102 may provide the input data to the RFFT layer of processing layer 502. For example, time series analysis system 102 may provide the features of the time series of data points associated with a contemporary transaction metric, the features of the time series of data points associated with a historical transaction metric, and/or the features of the time series of data points associated with a historical target transaction metric as inputs to the RFFT layer of processing layer 502.

As further shown in FIG. 5B, time series analysis system 102 may apply RFFT to each feature individually using the RFFT layer of processing layer 502. For example, time series analysis system 102 may apply RFFT to each feature of the time series of data points associated with a contemporary transaction metric individually using the RFFT layer of processing layer 502. Time series analysis system 102 may apply RFFT to each feature of the time series of data points associated with a historical transaction metric and/or each feature of the time series of data points associated with a historical target transaction metric individually using the RFFT layer of processing layer 502. In some non-limiting embodiments or aspects, time series analysis system 102 may generate outputs based on applying RFFT to each feature individually using the RFFT layer of processing layer 502. For example, time series analysis system 102 may generate a real part and an imaginary part for each feature of the time series of data points associated with a contemporary transaction metric, each feature of the time series of data points associated with a historical transaction metric, and/or each feature of the time series of data points associated with a historical target transaction metric based on time series analysis system 102 applying RFFT to each feature individually using the RFFT layer of processing layer 502.

In some non-limiting embodiments or aspects, time series analysis system 102 may split the outputs into a real part and an imaginary part for each feature. For example, time series analysis system 102 may split the outputs of each feature of the time series of data points associated with a contemporary transaction metric, each feature of the time series of data points associated with a historical transaction metric, and/or each feature of the time series of data points associated with a historical target transaction metric into a real part and an imaginary part for each feature. In some non-limiting embodiments or aspects, time series analysis system 102 may combine (e.g., group) the real parts and the imaginary parts for each feature (e.g., each feature of the time series of data points associated with a contemporary transaction metric, a historical transaction metric, and/or a historical target transaction metric) individually based on time series analysis system 102 splitting the outputs into the real part and the imaginary part for each feature.

In some non-limiting embodiments or aspects, time series analysis system 102 may combine the real parts for each feature to generate a combined real part of features. For example, time series analysis system 102 may combine the real parts for each feature of the time series of data points associated with a contemporary transaction metric to generate a combined real part of features of the time series of data points associated with a contemporary transaction metric. Time series analysis system 102 may combine the real parts for each feature of the time series of data points associated with a historical transaction metric to generate a combined real part of features of the time series of data points associated with a historical transaction metric. Time series analysis system 102 may combine the real parts for each feature of the time series of data points associated with a historical target transaction metric to generate a combined real part of features of the time series of data points associated with a historical target transaction metric.

In some non-limiting embodiments or aspects, time series analysis system 102 may combine the imaginary parts for each feature to generate a combined imaginary part of features. For example, time series analysis system 102 may combine the imaginary parts for each feature of the time series of data points associated with a contemporary transaction metric to generate a combined imaginary part of features of the time series of data points associated with a contemporary transaction metric. Time series analysis system 102 may combine the imaginary parts for each feature of the time series of data points associated with a historical transaction metric to generate a combined imaginary part of features of the time series of data points associated with a historical transaction metric. Time series analysis system 102 may combine the imaginary parts for each feature of the time series of data points associated with a historical target transaction metric to generate a combined imaginary part of features of the time series of data points associated with a historical target transaction metric.

In some non-limiting embodiments or aspects, time series analysis system 102 may generate an output of processing layer 502. For example, time series analysis system 102 may generate an output of processing layer 502 including the combined real part of features and the combined imaginary part of features of the time series of data points associated with a contemporary transaction metric, the combined real part of features and the combined imaginary part of features of the time series of data points associated with a historical transaction metric, and/or the combined real part of features and the combined imaginary part of features of the time series of data points associated with a historical target transaction metric.

In some non-limiting embodiments or aspects, a time series input $T_M$, with f features, the k-th feature denoted as $T_{Mk}=[t_0, \ldots, t_{T_c}]$, then the discrete Fourier transform will output a sequence of complex numbers at the m-th time of the k-th feature as:

$$F^\star_{M_{k,m}} = \sum_{n=0}^{\tau_c-1} t_n \cdot e^{-\frac{i \cdot 2\pi}{N}mn} \quad (1)$$

$$= \underbrace{\sum_{n=0}^{\tau_c-1} t_n \cos\left(\frac{2\pi}{N}mn\right)}_{F^{R\star}_{M_{k,m}}} - i\underbrace{\sum_{n=0}^{\tau_c-1} t_n \cdot \sin\left(\frac{2\pi}{N}mn\right)}_{F^{I\star}_{M_{k,m}}} \quad (2)$$

The real and imaginary parts of $F^*_{Mk,m}$ are denoted as $F_{Mk,m}{}^{R*}$ and $FI^*_{Mk,m}$, respectively. The transform of equations 1 and 2 may also be used for the other time series inputs, $T_H$ and $T_E$.

Given a time step it, contemporary transaction metric, $T_M$, historical transaction metric, $T_H$, and historical target transaction metric $T_E$, a gap between contemporary and historical period g, a historical length (e.g., a length of $T_H$ and $T_E$), $t_h$, and a prediction length (e.g., a length of $T_M$) of $t_p$, the model F can be written as:

$$\hat{T}_U[\mu-t_a:\mu+t_b] \leftarrow F(T_M[\mu-t_p:\mu], T_H[v:v+t_h], T_E[v:v+t_h])$$

where $t_a$ and $t_b$ are the left and right boundaries of a targeted prediction period such that $[\mu-t_a:\mu+t_b]$ is the targeted prediction period, and $v=\mu-t_p-g-t_h$.

In some non-limiting embodiments or aspects, an optimization goal during training may be defined as follows:

$$\sum_{T \in T, \mu \in [1, \tau_c - \tau_b]} \text{loss}\left(\hat{T}_U[\mu-t_a:\mu+t_b], T_U[\mu-t_a:\mu+t_b]\right) \quad (3)$$

where $\mu - t_p - g - t_h \geq 0$

In some non-limiting embodiments or aspects, the input features, $F_M$, of the time series of the contemporary transaction metric ($T_M$), the input features, $F_H$, of the time series of the historical transaction metric ($T_H$), and the input features, $F_E$, of the time series of the historical target transaction metric ($T_E$) may be transformed from the time domain into the frequency domain by a Fourier layer (e.g., a layer including a Fourier Transform, such as a DFT, for example, an FFT, an RFFT, etc.). This transformation may enable the succeeding layers to capture the underlying patterns of transaction metric features. Specifically, for the k-th feature in $F_M$ and $F_H$:

$$F^\star_{M_k} = \left[F^{R\star}_{M_{k,0}} + iF^{I\star}_{M_{k,0}}, \ldots, F^{R\star}_{M_{k,\tau_c-1}} + iF^{I\star}_{M_{k,\tau_c-1}}\right] \quad (4)$$

$$F^\star_{H_k} = \left[F^{R\star}_{H_{k,0}} + iF^{I\star}_{H_{k,0}}, \ldots, F^{R\star}_{H_{k,\tau_h-1}} + iF^{I\star}_{H_{k,\tau_h-1}}\right]$$

Specifically, for the k-th feature in $F_E$:

$$F^\star_E = \left[F^{R\star}_{E_0} + iF^{I\star}_{E_0}, \ldots, F^{R\star}_{E_{\tau_h-1}} + iF^{I\star}_{E_{\tau_h-1}}\right] \quad (5)$$

where each complex number in the series is transformed by a Fourier transform, such as a DFT, for example, an FFT or an RFFT. Since the input features, $F_M$, $F_H$, and $F_E$ are real numbers, the output of the Fourier transform, $F^*_{Mk}$, $F^*_{Hk}$, and $F^*_E$ are symmetric. That means, if $F^*_{Mk}$ contains a number of time steps (e.g., 168 time steps), then there will be half that number of frequencies, (e.g., 84 different frequencies) in $F^*_{Mk}$. Thereafter, the complex value outputs are split into real and imaginary parts:

$$F_{M_k}^{R\star} = \left[F_{M_{k,0}}^{R\star}, \ldots, F_{M_{k,\tau_c-1}}^{R\star}\right], F_{M_k}^{I\star} = \left[F_{M_{k,0}}^{I\star}, \ldots, F_{M_{k,\tau_c-1}}^{I\star}\right] \quad (6)$$

$$F_{H_k}^{R\star} = \left[F_{H_{k,0}}^{R\star}, \ldots, F_{H_{k,\tau_c-1}}^{R\star}\right], F_{H_k}^{I\star} = \left[F_{H_{k,0}}^{I\star}, \ldots, F_{H_{k,\tau_c-1}}^{I\star}\right] \quad (7)$$

$$F_{E}^{R\star} = \left[F_{E_0}^{R\star}, \ldots, F_{E_{\tau_c-1}}^{R\star}\right], F_{E}^{I\star} = \left[F_{E_0}^{I\star}, \ldots, F_{E_{\tau_c-1}}^{I\star}\right] \quad (8)$$

Figure 5C:
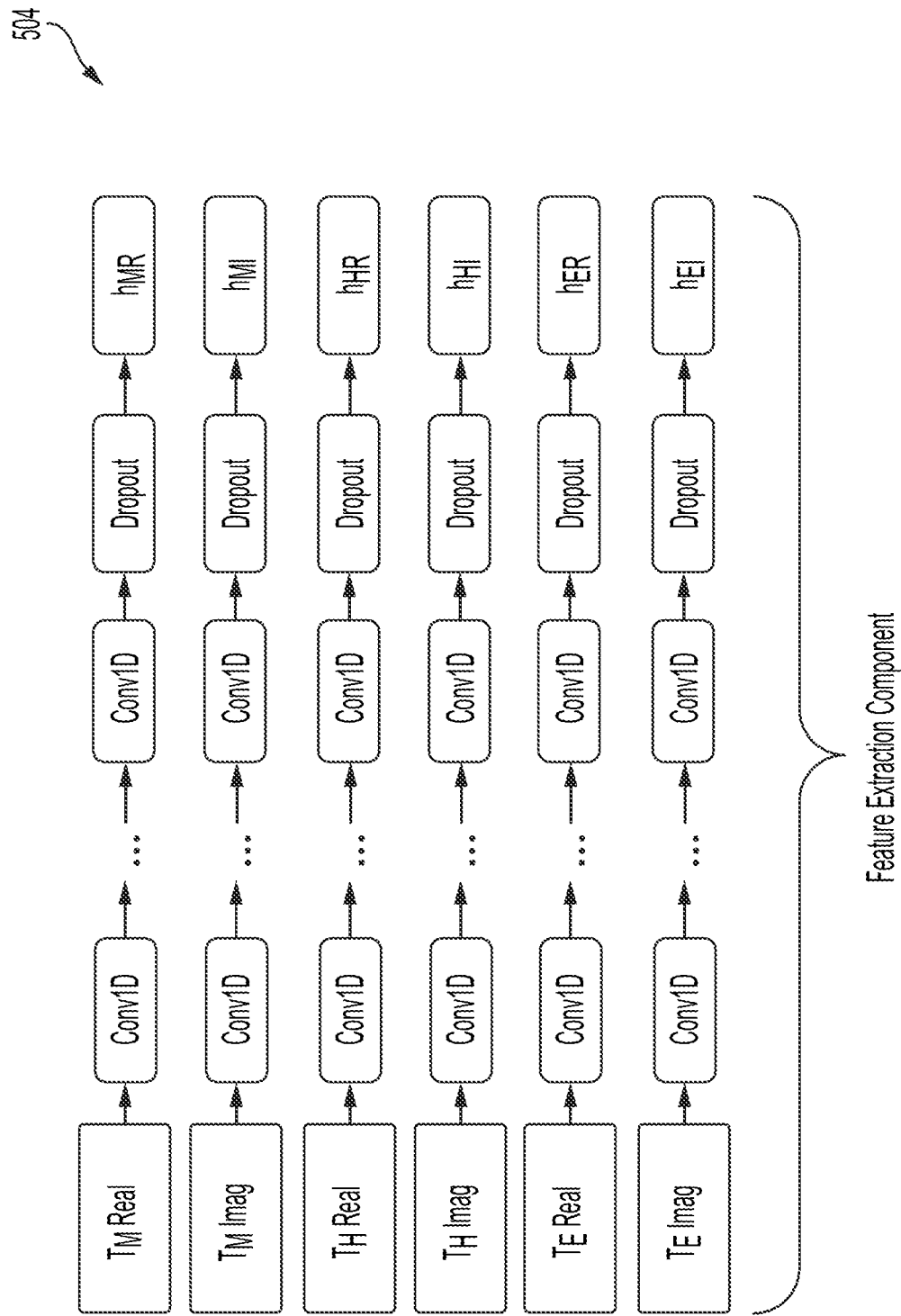

As shown in FIG. 5C, feature extraction component 504 may include one or more one-dimensional convolutional layers (e.g., one-dimensional feature extraction convolutional layers) and a dropout layer. As further shown in FIG. 5C, inputs to feature extraction component 504 may include the combined real part of features and the combined imaginary part of features (e.g., features of a time series of data points associated with a contemporary transaction metric, $T_M$, features of a time series of data points associated with a historical transaction metric, $T_H$, and/or features of a time series of data points associated with a historical target transaction metric, $T_E$). In some non-limiting embodiments or aspects, time series analysis system 102 may provide the inputs to feature extraction component 504. In some non-limiting embodiments or aspects, time series analysis system 102 may provide the inputs to the one or more one-dimensional feature extraction convolutional layers of feature extraction component 504. For example, time series analysis system 102 may provide the combined real part of features and the combined imaginary part of features (e.g., the outputs of processing layer 502) of the time series of data points associated with a contemporary transaction metric, the combined real part of features and the combined imaginary part of features of the time series of data points associated with a historical transaction metric, and/or the combined real part of features and the combined imaginary part of features of the time series of data points associated with a historical target transaction metric as inputs to the one or more one-dimensional feature extraction convolutional layers of feature extraction component 504.

In some non-limiting embodiments or aspects, time series analysis system 102 may extract features in a frequency domain using feature extraction component 504. For example, time series analysis system 102 may extract features of the time series of data points associated with a contemporary transaction metric in the frequency domain using the one or more one-dimensional feature extraction convolutional layers of feature extraction component 504. Time series analysis system 102 may extract features of the time series of data points associated with a historical transaction metric in the frequency domain using the one or more one-dimensional feature extraction convolutional layers of feature extraction component 504. Time series analysis system 102 may extract features of the time series of data points associated with a historical target transaction metric in the frequency domain using the one or more one-dimensional feature extraction convolutional layers of feature extraction component 504.

In some non-limiting embodiments or aspects, time series analysis system 102 may generate an output including extracted features from the one or more one-dimensional feature extraction convolutional layers of feature extraction component 504.

In some non-limiting embodiments or aspects, time series analysis system 102 may provide the output including extracted features from the one or more one-dimensional feature extraction convolutional layers as input to the dropout layer of feature extraction component 504.

In some non-limiting embodiments or aspects, time series analysis system 102 may generate a real feature vector (e.g., a real contemporary transaction metric feature vector, a real historical transaction metric feature vector, and/or a real historical target transaction metric feature vector) using the dropout layer of feature extraction component 504 based on time series analysis system 102 providing the input (e.g., the output of the one-dimensional feature extraction convolutional layer for the combined real part of features) to the dropout layer. For example, time series analysis system 102 may generate a real contemporary transaction metric feature vector using the dropout layer of feature extraction component 504. Time series analysis system 102 may generate a real historical transaction metric feature vector using the dropout layer of feature extraction component 504. Time series analysis system 102 may generate a real historical target transaction metric feature vector using the dropout layer of feature extraction component 504. In some non-limiting embodiments or aspects, the use of a dropout layer in feature extraction component 504 may be limited.

In some non-limiting embodiments or aspects, time series analysis system 102 may generate an imaginary feature vector (e.g., an imaginary contemporary transaction metric feature vector, an imaginary historical transaction metric feature vector, and/or an imaginary historical target transaction metric feature vector) using the dropout layer of feature extraction component 504 based on time series analysis system 102 providing the input (e.g., the output of the one-dimensional feature extraction convolutional layer for the combined imaginary part of features) to the dropout layer. For example, time series analysis system 102 may generate an imaginary contemporary transaction metric feature vector using the dropout layer of feature extraction component 504. Time series analysis system 102 may generate an imaginary historical transaction metric feature vector using the dropout layer of feature extraction component 504. Time series analysis system 102 may generate an imaginary historical target transaction metric feature vector using the dropout layer of feature extraction component 504. In some non-limiting embodiments or aspects, the use of a dropout layer in feature extraction component 504 may be limited.

Before being used as inputs to a one dimensional convolution layer (Conv1D), all of the transformed features in $F_M$ and $F_H$ may be combined:

$$F_M^{R*}=[F_{M_0}^{R*}, \ldots, F_{M_{f-1}}^{R*}], F_M^{I*}=[F_{M_0}^{I*}, \ldots, F_{M_{f-1}}^{I*}]$$

$$F_H^{R}=[F_{H_0}^{R*}, \ldots, F_{H_{f-1}}^{R*}], F_H^{I*}=[F_{H_0}^{I*}, \ldots, F_{H_{f-1}}^{I*}] \quad (9)$$

The last step in a feature extraction process, performed using feature extraction component 504, may be to use the Conv1D layers to extract features. The convolutional neural network (CNN) that includes the Conv1D layers may be defined as:

$$h^{(l)} = \begin{cases} \text{ReLU}(w^{(l)} h^{(l-1)} + b^{(l)}) & l > 1 \\ \text{ReLU}(w^{(l)} x + b^{(l)}) & l = 1 \end{cases} \quad (10)$$

where $l \geq 1$ represents the l-th layer, $h^{(l)}$ is the output of the l-th layer, $w^{(l)}$ and $b^{(l)}$ are the weights and bias of the l-th layer. x in the first layer (l=0) represents $F_M^{R*}$, $F_M^{I*}$, $F_H^{R*}$, $F_H^{I*}$, $F_E^{R*}$, and $F_E^{I*}$. For the above six inputs, the respective outputs of the Conv1D layers are denoted as $h^{(l)}_{MR}$, $h^{(l)}_{MI}$, $h^{(l)}_{HR}$, $h^{(l)}_{HI}$, $h^{(l)}_{ER}$, and $h^{(l)}_{EI}$.

Figure 5D:
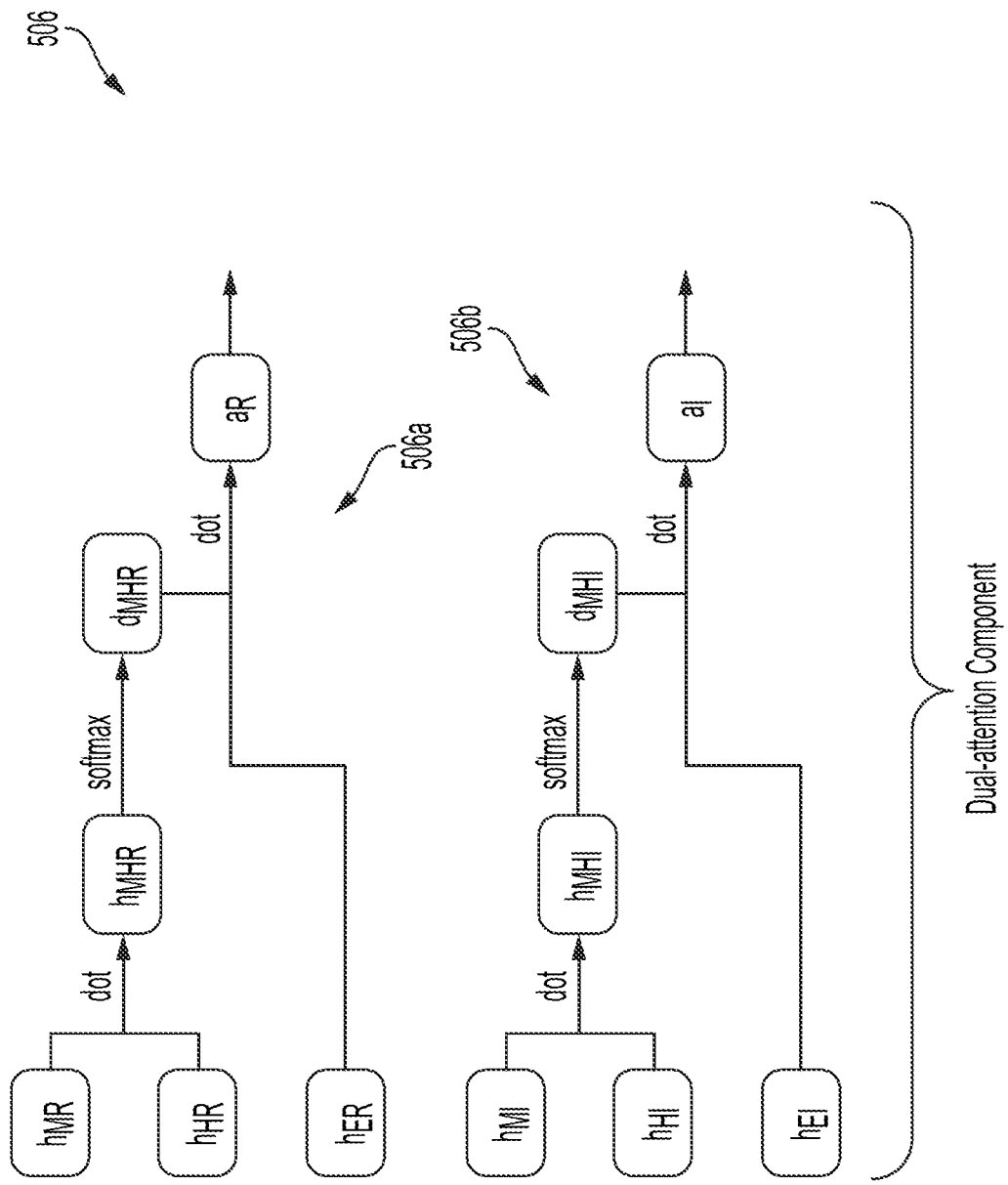

As shown in FIG. 5D, dual-attention component 506 may include one or more dot product layers (e.g., one or more layers that include a dot product function that generates a dot product) and one or more softmax layers. In some non-limiting embodiments or aspects, dual-attention component 506 may include an activation function layer in place of a dot product layer. In some non-limiting embodiments or aspects, the activation function layer may include an addition function and/or a tanh activation function.

As further shown in FIG. 5D, inputs to dual-attention component 506 may include the real and/or imaginary feature vectors (e.g., the real contemporary transaction metric feature vector, the real historical transaction metric feature vector, and/or the real historical target transaction metric feature vector). In some non-limiting embodiments or aspects, time series analysis system 102 may provide the inputs to dual-attention component 506. In some non-limiting embodiments or aspects, time series analysis system 102 may provide the inputs to the one or more dot product layers of dual-attention component 506. For example, time series analysis system 102 may provide the real contemporary transaction metric feature vector, the real historical transaction metric feature vector, and/or the real historical target transaction metric feature vector (e.g., the outputs of feature extraction component 504) as inputs to the one or more dot product layers of dual-attention component 506. As a further example, time series analysis system 102 may provide the imaginary contemporary transaction metric feature vector, the imaginary historical transaction metric feature vector, and/or the imaginary historical target transaction metric feature vector (e.g., the outputs of feature extraction component 504) as inputs to the one or more dot product layers of dual-attention component 506. In some non-limiting embodiments or aspects, dual-attention component 506 may process a dominant frequency.

In some non-limiting embodiments or aspects, time series analysis system 102 may provide the inputs to the one or more activation function layers of dual-attention component 506. For example, time series analysis system 102 may provide the real contemporary transaction metric feature vector, the real historical transaction metric feature vector, and/or the real historical target transaction metric feature vector (e.g., the outputs of feature extraction component 504), as inputs to the one or more activation function layers of dual-attention component 506. As a further example, time series analysis system 102 may provide the imaginary contemporary transaction metric feature vector (e.g., the outputs of feature extraction component 504), the imaginary historical transaction metric feature vector, and/or the imaginary historical target transaction metric feature vector as inputs to the one or more activation function layers of dual-attention component 506.

In some non-limiting embodiments or aspects, time series analysis system 102 may perform an addition function on the real contemporary transaction metric feature vector and the real historical transaction metric feature vector using the activation function layer of dual-attention component 506. In some non-limiting embodiments or aspects, time series analysis system 102 may provide the result of the addition function of the real contemporary transaction metric feature vector and the real historical transaction metric feature vector as an input to a tanh activation function. In some non-limiting embodiments or aspects, time series analysis system 102 may perform a tanh activation function on the real contemporary transaction metric feature vector and the real historical transaction metric feature vector using the activation function layer of dual-attention component 506.

In some non-limiting embodiments or aspects, time series analysis system 102 may provide the result of the tanh activation function of the real contemporary transaction metric feature vector and the real historical transaction metric feature vector as an input to the softmax layer of dual-attention component 506. For example, time series analysis system 102 may provide the output of the tanh activation function input to the softmax layer of dual-attention component 506 to generate a real attention feature vector.

In some non-limiting embodiments or aspects, time series analysis system 102 may generate a dot product layer of the real attention feature vector and the real historical target transaction metric feature vector. For example, time series analysis system 102 may generate a dot product layer of the real attention feature vector and the real historical target transaction metric feature vector to generate a real component attention matrix.

In some non-limiting embodiments or aspects, time series analysis system 102 may perform an addition function on the imaginary contemporary transaction metric feature vector and the imaginary historical transaction metric feature vector using the activation function layer of dual-attention component 506. In some non-limiting embodiments or aspects, time series analysis system 102 may provide the result of the addition function of the imaginary contemporary transaction metric feature vector and the imaginary historical transaction metric feature vector as an input to a tanh activation function. In some non-limiting embodiments or aspects, time series analysis system 102 may perform a tanh activation function on the imaginary contemporary transaction metric feature vector and the imaginary historical transaction metric feature vector using the activation function layer of dual-attention component 506. In some non-limiting embodiments or aspects, time series analysis system 102 may provide the result of the tanh activation function of the imaginary contemporary transaction metric feature vector and the imaginary historical transaction metric feature vector as an input to the softmax layers of dual-attention component 506. For example, time series analysis system 102 may provide the output of the tanh activation function input to the softmax layers of dual-attention component 506 to generate an imaginary attention feature vector.

In some non-limiting embodiments or aspects, time series analysis system 102 may generate a dot product layer of the imaginary contemporary transaction metric feature vector and the imaginary historical transaction metric feature vector using the dot product layers of dual-attention component 506. In some non-limiting embodiments or aspects, time series analysis system 102 may provide the dot product layer of the imaginary contemporary transaction metric feature vector and the imaginary historical transaction metric feature vector as an input to the softmax layers of dual-attention component 506. For example, time series analysis system 102 may provide the dot product layer as an input to the softmax layers of dual-attention component 506 to generate an imaginary attention feature vector.

In some non-limiting embodiments or aspects, time series analysis system 102 may generate a dot product layer of the imaginary attention feature vector and the imaginary historical target transaction metric feature vector. For example, time series analysis system 102 may generate a dot product layer of the imaginary attention feature vector and the imaginary historical target transaction metric feature vector to generate an imaginary component attention matrix. In some non-limiting embodiments or aspects, time series analysis system 102 may generate the real component attention matrix and/or the imaginary component attention matrix as the outputs of dual-attention component 506.

In some non-limiting embodiments or aspects, the real component attention matrix may include an attention vector (e.g., a real attention feature vector) corresponding to each feature. For example, the real component attention matrix may include an attention vector corresponding to each feature of the time series of data points associated with a contemporary transaction metric. The real component attention matrix may include an attention vector corresponding to each feature of the time series of data points associated with a historical transaction metric. The real component attention matrix may include an attention vector corresponding to each feature of the time series of data points associated with a historical target transaction metric.

In some non-limiting embodiments or aspects, the imaginary component attention matrix may include an attention vector (e.g., an imaginary attention feature vector) corresponding to each feature. For example, the imaginary component attention matrix may include an attention vector corresponding to each feature of the time series of data points associated with a contemporary transaction metric. The imaginary component attention matrix may include an attention vector corresponding to each feature of the time series of data points associated with a historical transaction metric. The imaginary component attention matrix may include an attention vector corresponding to each feature of the time series of data points associated with a historical target transaction metric.

In some non-limiting embodiments or aspects, the inputs to dual-attention component 506 (e.g., the real and/or imaginary feature vectors) may have a same dimension as the number of features (e.g., a dimension equal to the number of features). For example, the real contemporary transaction metric feature vector, the real historical transaction metric feature vector, and/or the real historical target transaction metric feature vector may have 14 features and a dimension equal to 14. As a further example, the imaginary contemporary transaction metric feature vector, the imaginary historical transaction metric feature vector, and/or the imaginary historical target transaction metric feature vector may have 14 features and a dimension equal to 14.

In some non-limiting embodiments or aspects, time series analysis system 102 may apply an attention mechanism (e.g., dual-attention component 506) for each dimension of the real and/or imaginary feature vectors. For example, time series analysis system 102 may apply dual-attention component 506 on the real contemporary transaction metric feature vector, the real historical transaction metric feature vector, and/or the real historical target transaction metric feature vector for each dimension of the real feature vectors. As a further example, time series analysis system 102 may apply dual-attention component 506 on the imaginary contemporary transaction metric feature vector, the imaginary historical transaction metric feature vector, and/or the imaginary historical target transaction metric feature vector for each dimension of the imaginary feature vectors.

As further shown in FIG. 5D, machine learning model architecture 500 includes dual-attention component 506, where attention component 506a is for the real part and attention component 506b is for the imaginary part. An objective of using attention components is that dual-attention component 506 may be generated using complete frequency-domain historical data (e.g., a time series of the historical transaction metric, values of features of the historical transaction metric, a time series of the historical target transaction metric, values of features of the historical target transaction metric, etc.), and dual-attention component 506 may be able to direct the prediction of machine learning model architecture 500 based on the characteristics of the contemporary data (e.g., a time series of the contemporary transaction metric, values of features of the contemporary transaction metric, etc.). In some non-limiting embodiments or aspects, if there is a time period between the historical data and the contemporary data that is incomplete, the time period of the gap may not be used during (e.g., may be excluded from) training. The gap may be relative to the beginning (e.g., a starting time stamp) of the contemporary transaction metric, and the incomplete time period may not be the same if a beginning of a time series of the contemporary transaction metric differs in different time series.

In some non-limiting embodiments or aspects, the historical transaction metric may be used as an attention key, the historical target transaction metric as an attention value, and the contemporary transaction metric as a query. The attention components of dual-attention component 506 (e.g., the attention layers of dual-attention component 506) for real and imaginary parts of inputs in machine learning model architecture 500 can be written as:

$$A_R = \text{softmax}(h_{MR} \cdot h_{HR}^T)$$

$$A_I = \text{softmax}(h_{MI} \cdot h_{HI}^T) \quad (11)$$

Figure 5E:
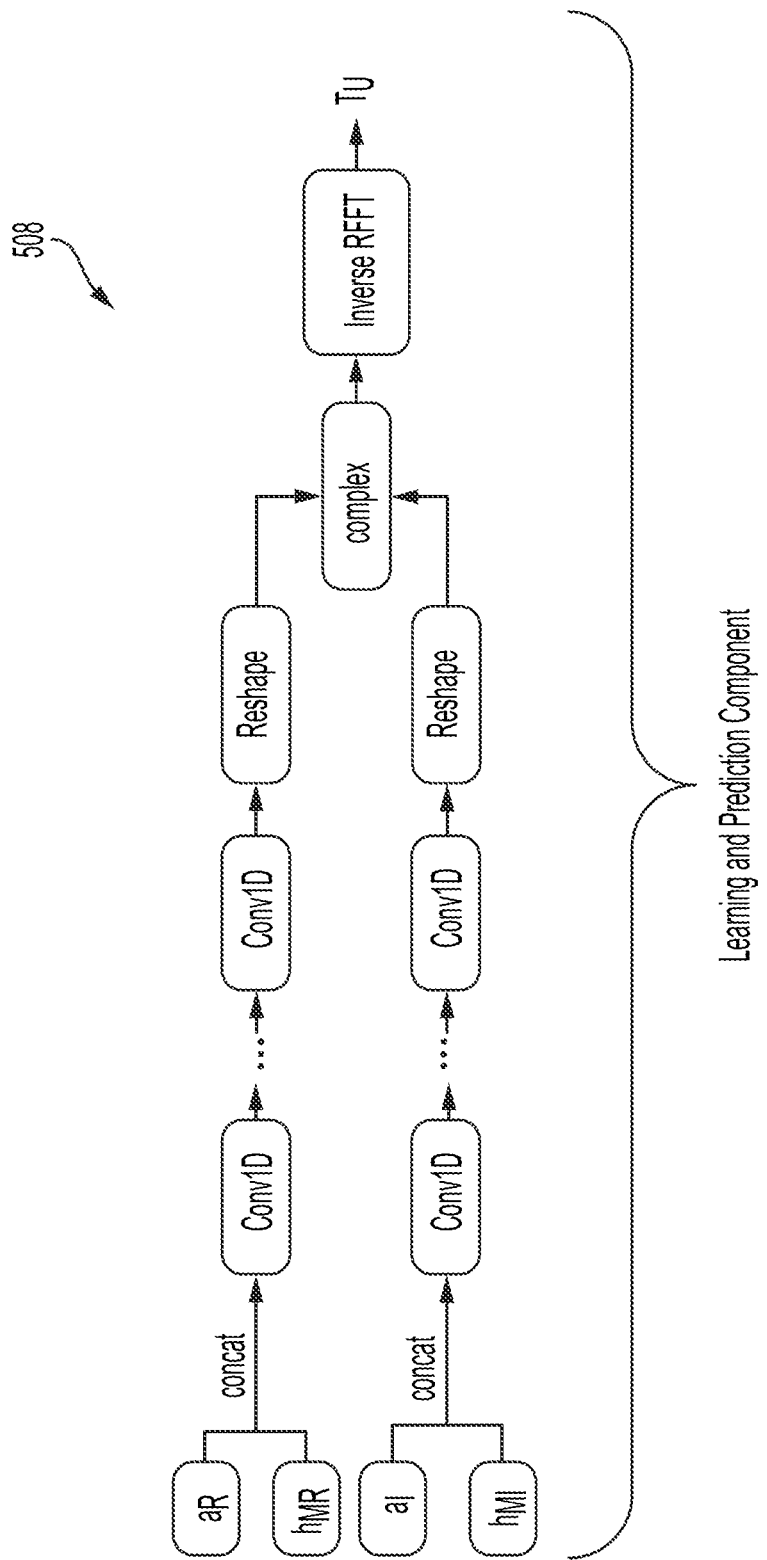

As shown in FIG. 5E, learning and prediction component 508 may include a concatenation layer, one or more one-dimensional feature extraction convolutional layers, a reshape layer, a complex layer, and an inverse FFT layer. As further shown in FIG. 5E, inputs to learning and prediction component 508 may include the real and/or imaginary component attention matrices (e.g., the outputs of dual-attention component 506) and the real and/or imaginary contemporary transaction metric feature vector. In some non-limiting embodiments or aspects, learning and prediction component 508 may include a feature learning component that includes one or more one-dimensional convolutional layer (e.g., a feature learning one-dimensional convolutional layer).

In some non-limiting embodiments or aspects, time series analysis system 102 may provide the inputs (e.g., the outputs of dual-attention component 506) to learning and prediction component 508. In some non-limiting embodiments or aspects, time series analysis system 102 may provide the inputs to the concatenation layer of learning and prediction component 508. For example, time series analysis system 102 may provide the real component attention matrix and the real contemporary transaction metric feature vector as inputs to the concatenation layer of learning and prediction component 508. As a further example, time series analysis system 102 may provide the imaginary component attention matrix and the imaginary contemporary transaction metric feature vector as inputs to the concatenation layer of learning and prediction component 508.

In some non-limiting embodiments or aspects, time series analysis system 102 may concatenate the inputs (e.g., the outputs of dual-attention component 506) using learning and prediction component 508. For example, time series analysis system 102 may concatenate the real component attention matrix and the real contemporary transaction metric feature vector to generate a first concatenation. As a further example, time series analysis system 102 may concatenate the imaginary component attention matrix and the imaginary contemporary transaction metric feature vector to generate a second concatenation. In some non-limiting embodiments or aspects, time series analysis system 102 may provide the first concatenation as an input to the one or more one-dimensional convolutional layer (e.g., feature learning one-dimensional convolutional layer). In some non-limiting embodiments or aspects, time series analysis system 102 may provide the second concatenation as an input to the one or more one-dimensional convolutional layers (e.g., feature learning one-dimensional convolutional layer). In some non-limiting embodiments or aspects, time series analysis system 102 may learn features using the one or more feature learning one-dimensional convolutional layers of learning and prediction component 508. For example, time series analysis system 102 may learn features of the first and/or second concatenation using the one or more feature learning one-dimensional convolutional layer of learning and prediction component 508.

In some non-limiting embodiments or aspects, time series analysis system 102 may generate an output based on the feature learning one-dimensional convolutional layer for the first and/or second concatenation. In some non-limiting embodiments or aspects, time series analysis system 102 may provide the output based on the feature learning one-dimensional convolutional layer for the first and/or second concatenation as an input to the reshape layer. For example, time series analysis system 102 may provide the output based on the feature learning one-dimensional convolutional layer for the first concatenation to the reshape layer to generate a real component feature vector. As a further example, time series analysis system 102 may provide the output based on the feature learning one-dimensional convolutional layer for the second concatenation to the reshape layer to generate an imaginary component feature vector.

In some non-limiting embodiments or aspects, time series analysis system 102 may reshape (e.g., squeeze) the dimensions of the input to the reshape layer (e.g., the output based on the feature learning one-dimensional convolutional layer for the first and/or second concatenation) where the dimensions of the input have a shape of 1 using the reshape layer of learning and prediction component 508. In some non-limiting embodiments or aspects, time series analysis system 102 may provide the output of the reshape layer (e.g., the real component feature vector, the imaginary component feature vector) as input to the complex layer of learning and prediction component 508. In some non-limiting embodiments or aspects, time series analysis system 102 may use the output of the reshape layer (e.g., the real component feature, the imaginary component feature vector) to build (e.g., generate) a complex number.

In some non-limiting embodiments or aspects, time series analysis system 102 may generate a complex number feature vector using the complex layer of learning and prediction component 508. For example, time series analysis system 102 may generate the complex number feature vector based on the real component feature vector and the imaginary component feature vector using the complex layer of learning and prediction component 508. In some non-limiting embodiments or aspects, time series analysis system 102 may provide the output of the complex layer (e.g., the complex number feature vector) as an input to the inverse FFT layer of learning and prediction component 508.

In some non-limiting embodiments or aspects, time series analysis system 102 may generate a contemporary target transaction metric using the inverse FFT layer of learning and prediction component 508. For example, time series analysis system 102 may generate a contemporary target transaction metric using the inverse FFT layer of learning and prediction component 508 by transforming the complex number feature vector to predictions of a plurality of time steps.

In some non-limiting embodiments or aspects, a context vector (e.g., a first concatenation that is generated based on concatenating a real component attention matrix and a real contemporary transaction metric feature vector or a second concatenation that is generated based on concatenating the imaginary component attention matrix and the imaginary contemporary transaction metric feature vector) for real and imaginary part of inputs in machine learning model architecture 500 can be written as:

$$C_R = A_R \oplus h_{ER}$$

$$C_I = A_I \oplus h_{EI} \quad (12)$$

where $\oplus$ represents a concatenation operation.

An alternative attention design for the real and imaginary part of inputs can be written as:

$$A_R = \text{softmax}(\tanh(h_{MR} \cdot h^T_{HR}))$$

$$A_I = \text{softmax}(\tanh(h_{MI} \cdot h^T_{HI})) \quad (13)$$

In some non-limiting embodiments or aspects, a vector computed using the historical transaction metric may have a different shape from a vector or vectors computed using the contemporary transaction metric. This may be based on a longer time period that is used for the historical transaction metric as compared to the time period used for the contemporary transaction metric. In this way, in the frequency domain, a vector computed using the historical transaction metric, which may be based on a time period that is larger than the time period used for the contemporary transaction metric, may enable machine learning model architecture 500 to have a better understanding on what the history (e.g., a historical profile of an entity) is like, and produce a better prediction in frequency domain.

After dual-attention component 506, the last portion of machine learning model architecture 500 is learning and prediction component 508. In some non-limiting embodiments or aspects, a Conv1D layer may be used to learn patterns from a previous output. Specifically, the $h_R$ and $h_I$ may be computed as:

$$h_R = \text{ReLU}(w_R C_R + b_R)$$

$$h_I = \text{ReLU}(w_I C_I + b_I) \quad (14)$$

With the real and imaginary part both transformed, a complex number may be provided as:

$$h_{complex} = h_R + i \cdot h_I \quad (15)$$

An inverse RFFT may be used to get a prediction (e.g., a prediction of a time series for the contemporary target transaction metric, $T_U$) as a real number:

$$\hat{T}_U = \text{IRFFT}(h_{complex}) \quad (16)$$

Figure 6:
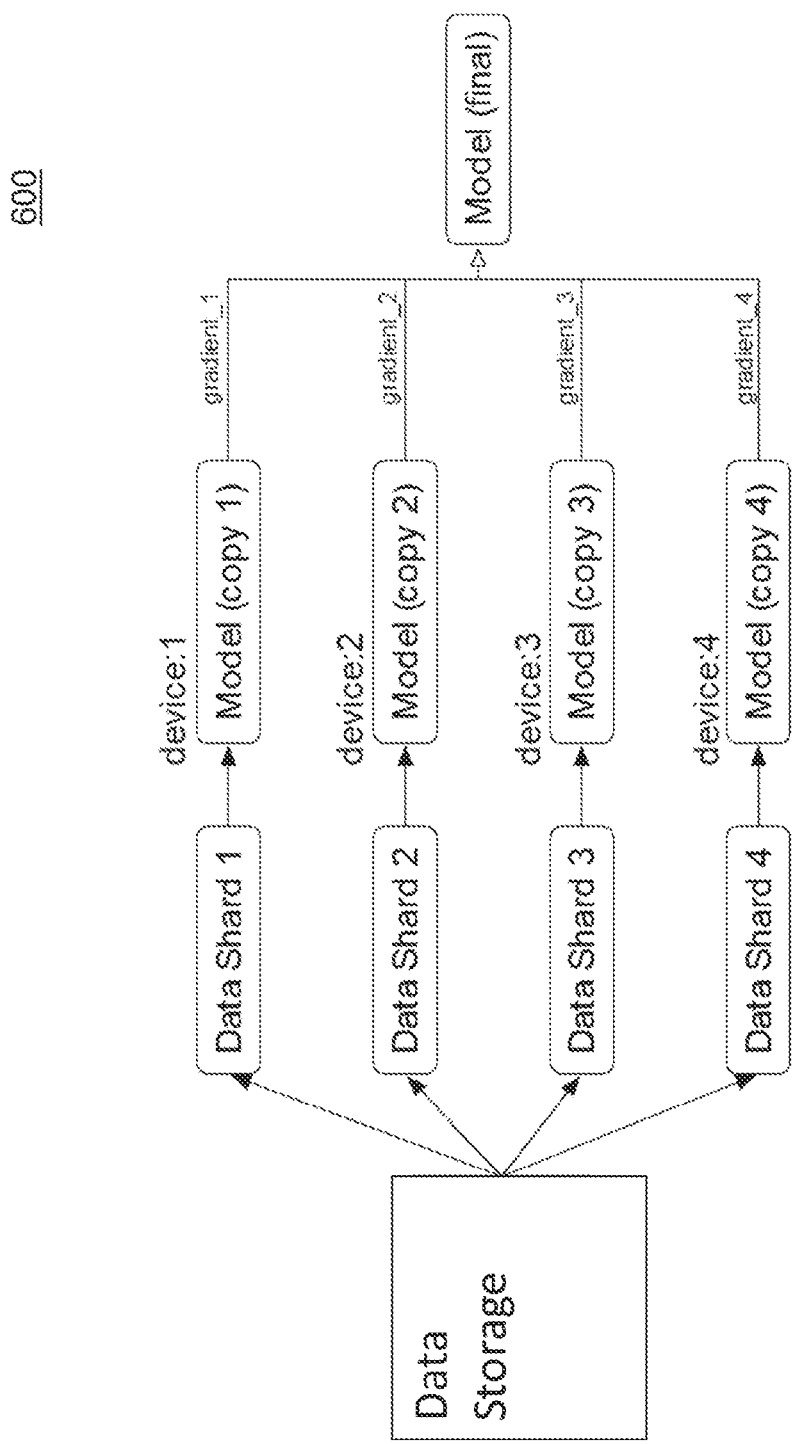
FIG. 6 is a diagram of a non-limiting embodiment or aspect of an implementation of a process for training a machine learning model in a distributed environment.

Referring now to FIG. 6, FIG. 6 is a diagram of a non-limiting embodiment or aspect of an implementation 600 of a process for training a machine learning model in a distributed environment.

As shown in FIG. 6, time series analysis system 102 may retrieve a plurality of data shards (e.g., data shard 1, data shard 2, data shard 3, and data shard 4) from a data storage device (e.g., a database device, a data repository device, etc.). In some non-limiting embodiments or aspects, a data shard may include an index of a time series (e.g., a multivariate time series, a time series for the contemporary transaction metric, a time series for a historical transaction metric, a time series for a historical target transaction metric, etc.). For example, the data shard may include an index of the time series that can be used to retrieve the time series instead of the values of the real time series. In some non-limiting embodiments or aspects, time series analysis system 102 may control a plurality of devices (e.g., device: 1, device: 2, device: 3, and device: 4; each of which is a computing device, such as a server, a central processing unit, a graphics processing unit, etc.) to train a machine learning model based on each data shard of the plurality of data shards. Each of the plurality of devices may have a copy (e.g., a copy having identical variables) of a machine learning model (e.g., a machine learning model corresponding to machine learning model architecture 500 or a machine learning model corresponding to components of machine learning model architecture 500) stored on that device. A gradient for the machine learning model may be provided by each device, and that gradient (e.g., gradient_1, gradient_2, gradient_3, or gradient_4) may be used to update one or more parameters of each respective machine learning model by each respective device. In some non-limiting embodiments or aspects, the one or more parameters of each respective machine learning model may be propagated to each device and used to update (e.g., update with an average of the one or more parameters) all copies of the machine learning model stored on all devices. In some non-limiting embodiments, a size (e.g., a batch size) of the number of devices, data shards, and/or copies of the machine learning model may be chosen by time series analysis system 102 after time series analysis system 102 compares the performance of the machine learning model using different parameters. In this way, time series analysis system 102 may provide a linear improvement in the speed at which training of the machine learning model takes place.

Figure 7:
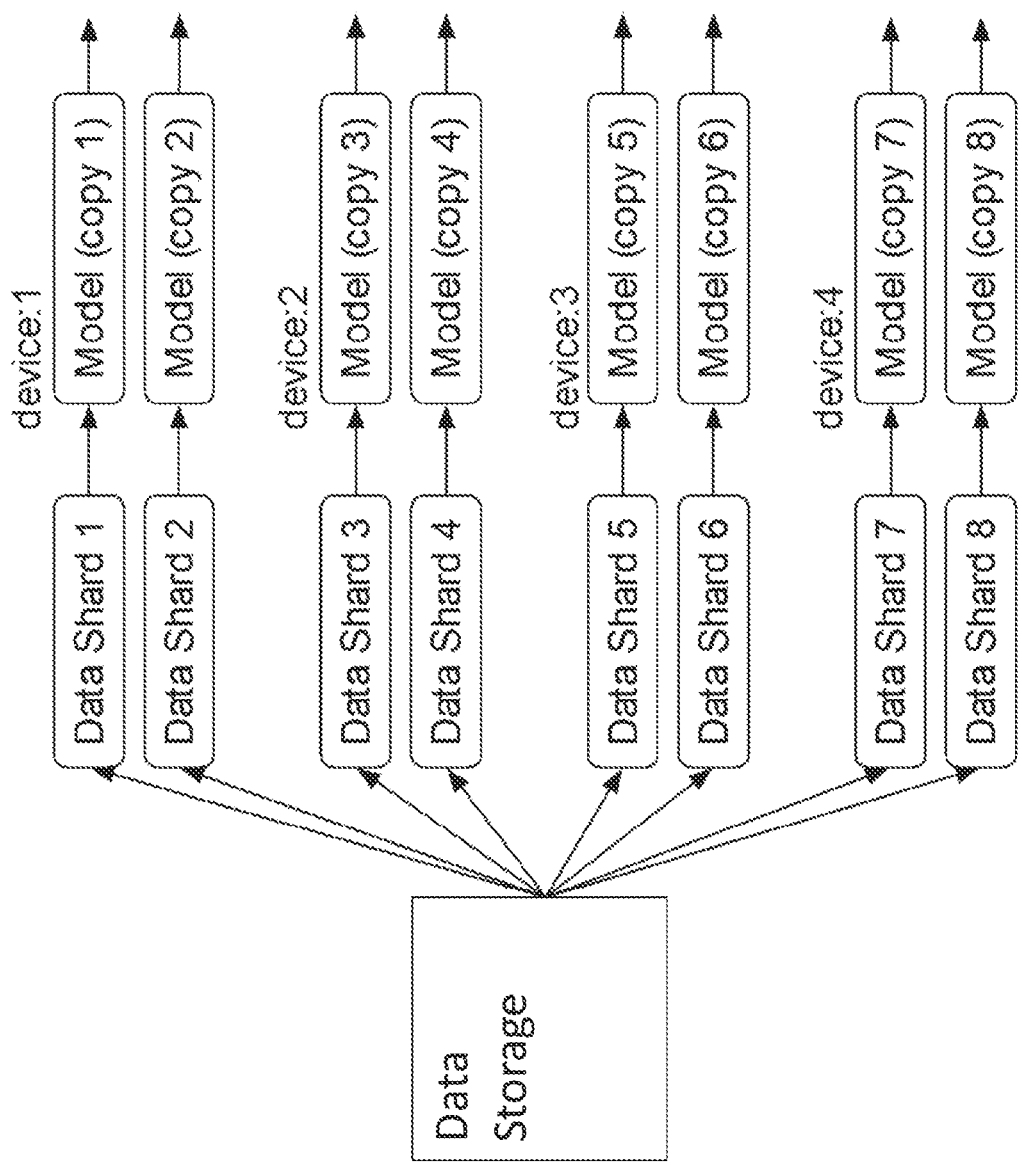
FIG. 7 is a diagram of a non-limiting embodiment or aspect of an implementation of a process for training a machine learning model in a distributed environment.

Referring now to FIG. 7, FIG. 7 is a diagram of a non-limiting embodiment or aspect of an implementation 700 of a process for training a machine learning model in a distributed environment. In some non-limiting embodiments or aspects, steps of implementation 700 may be the same or similar to implementation 600.

As shown in FIG. 7, time series analysis system 102 may retrieve a plurality of data shards (e.g., data shard 1, data shard 2, data shard 3, data shard 4, data shard 5, data shard 6, data shard 7, and data shard 8) from a data storage device (e.g., a database device, a data repository device, etc.). In some non-limiting embodiments or aspects, time series analysis system 102 may control a plurality of devices (e.g., device: 1, device: 2, device: 3, and device: 4; each of which is a computing device, such as a server, a central processing unit, a graphics processing unit, etc.) to train a machine learning model based on each data shard of the plurality of data shards. Each of the plurality of devices may have a copy (e.g., copies 1-8) of a machine learning model (e.g., a machine learning model corresponding to machine learning model architecture 500 or a machine learning model corresponding to components of machine learning model architecture 500) stored on that device.

As further shown in FIG. 7, a plurality of copies of machine learning models may be stored on each device, and each device may train the plurality of copies of machine learning models based on a plurality of data shards. For example, each device may store two copies of the machine learning model, and each device may train each of the two copies of the machine learning model using two data shards. In some non-limiting embodiments or aspects, time series analysis system 102 may use a job scheduling algorithm (e.g., a combinatorial optimization algorithm, such as a Greedy optimization algorithm) to optimize training steps for each copy of the machine learning model.

In some non-limiting embodiments or aspects, and similar to implement 600, a gradient for the machine learning model may be provided by each device, and that gradient may be used to update one or more parameters of each respective machine learning model by each respective device. In some non-limiting embodiments or aspects, the one or more parameters of each respective machine learning model may be propagated to each device and used to update (e.g., update with an average of the one or more parameters) all copies of the machine learning model stored on all devices. In this way, time series analysis system 102 may provide an improvement in the speed at which training of the machine learning model takes place as compared to an implementation where only a single data shard is used to train a single copy of a machine learning model.

Although the present disclosure has been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system, comprising:
at least one processor programmed or configured to:
receive a time series of historical data points, wherein the historical data points include values of a plurality of transaction features with regard to a plurality of time intervals during an initial time period;
determine a first time series of data points associated with a historical transaction metric and a second time series of data points associated with a historical target transaction metric from a historical time period, wherein the historical time period comprises a first time period of the initial time period;
determine a third time series of data points associated with a contemporary transaction metric from a contemporary time period, wherein the contemporary time period comprises a second time period of the initial time period that is after the historical time period, and wherein the historical time period is longer than the contemporary time period; and
train a machine learning model, wherein the machine learning model is configured to provide an output that comprises a predicted time series of data points associated with a contemporary target transaction metric, wherein the contemporary target transaction metric comprises a value of a target transaction metric during a targeted prediction period, and wherein, when training the machine learning model, the at least one processor is programmed or configured to:
generate an output of the machine learning model, wherein the output of the machine learning model comprises the contemporary target transaction metric, and wherein the contemporary target transaction metric comprises a value of a target transaction metric during a targeted prediction period;

provide the first time series of data points, the second time series of data points, and the third time series of data points as inputs to a processing layer of the machine learning model, wherein the processing layer comprises a fast Fourier transform (FFT) layer;
provide an output of the processing layer as an input to a feature extraction component of the machine learning model;
provide an output of the feature extraction component of the machine learning model as an input to a dual-attention component of the machine learning model; and
provide an output of the dual-attention component of the machine learning model as an input to a learning and prediction component of the machine learning model,
wherein, when providing the first time series of data points, the second time series of data points, and the third time series of data points as inputs to the processing layer, the at least one processor is programmed or configured to:
provide each feature of a first plurality of features of the first time series of data points as an input to the FFT layer to generate a real part and an imaginary part for each feature of the first plurality of features;
provide each feature of a second plurality of features of the second time series of data points as an input to the FFT layer to generate a real part and an imaginary part for each feature of the second plurality of features; and
provide each feature of a third plurality of features of the third time series of data points as an input to the FFT layer to generate a real part and an imaginary part for each feature of the third plurality of features;
combine the real part for each feature of the first plurality of features to generate a combined real part of the first plurality of features;
combine the imaginary part for each feature of the first plurality of features to generate a combined imaginary part of the first plurality of features;
combine the real part for each feature of the second plurality of features to generate a combined real part of the second plurality of features:
combine the imaginary part for each feature of the second plurality of features to generate a combined imaginary part of the second plurality of features;
combine the real part for each feature of the third plurality of features to generate a combined real part of the third plurality of features; and
combine the imaginary part for each feature of the third plurality of features to generate a combined imaginary part of the third plurality of features;
wherein the output of the processing layer of the machine learning model comprises the combined real part of the first plurality of features, the combined imaginary part of the first plurality of features, the combined real part of the second plurality of features, the combined imaginary part of the second plurality of features, the combined real part of the third plurality of features, and the combined imaginary part of the third plurality of features.

2. The system of claim 1, wherein, when training the machine learning model, the at least one processor is programmed or configured to:
provide the combined real part of the first plurality of features as an input to a one-dimensional feature extraction convolutional layer;
provide the combined imaginary part of the first plurality of features as an input to the one-dimensional feature extraction convolutional layer;
provide the combined real part of the second plurality of features as an input to the one-dimensional feature extraction convolutional layer;
provide the combined imaginary part of the second plurality of features as an input to the one-dimensional feature extraction convolutional layer;
provide the combined real part of the third plurality of features as an input to the one-dimensional feature extraction convolutional layer;
provide the combined imaginary part of the third plurality of features as an input to the one-dimensional feature extraction convolutional layer; and
generate the output of the feature extraction component of the machine learning model based on an output of the one-dimensional feature extraction convolutional layer.

3. The system of claim 2, wherein the input to the dual-attention component of the machine learning model comprises a real input portion and an imaginary input portion,
wherein the real input portion comprises:
a first real input based on an output of the one-dimensional feature extraction convolutional layer for the combined real part of the first plurality of features;
a second real input based on an output of the one-dimensional feature extraction convolutional layer for the combined real part of the second plurality of features; and
a third real input based on an output of the one-dimensional feature extraction convolutional layer for the combined real part of the third plurality of features; and
wherein the imaginary input portion comprises:
a first imaginary input based on an output of the one-dimensional feature extraction convolutional layer for the combined imaginary part of the first plurality of features;
a second imaginary input based on an output of the one-dimensional feature extraction convolutional layer for the combined imaginary part of the second plurality of features; and
a third imaginary input based on an output of the one-dimensional feature extraction convolutional layer for the combined imaginary part of the third plurality of features; and
wherein, when training the machine learning model, the at least one processor is programmed or configured to:
generate a real component attention matrix based on the real input portion, wherein the real component attention matrix has a number of attention vectors that is equal to a number of features of the plurality of transaction features; and
generate an imaginary component attention matrix based on the imaginary input portion, wherein the imaginary component attention matrix has a number of attention vectors that is equal to a number of features of the plurality of transaction features.

4. The system of claim 3, wherein the at least one processor is further programmed or configured to:
- generate the real input portion of the input to the dual-attention component of the machine learning model; and
- generate the imaginary input portion of the input to the dual-attention component of the machine learning model;
- wherein, when generating the real input portion of the input to the dual-attention component of the machine learning model, the at least one processor is programmed or configured to:
  - provide the output of the one-dimensional feature extraction convolutional layer for the combined real part of the first plurality of features as an input to a dropout layer to generate a real contemporary transaction metric feature vector as the first real input;
  - provide the output of the one-dimensional feature extraction convolutional layer for the combined real part of the second plurality of features as an input to the dropout layer to generate a real historical transaction metric feature vector as the second real input; and
  - provide the output of the one-dimensional feature extraction convolutional layer for the combined real part of the third plurality of features as an input to the dropout layer to generate a real historical target transaction metric feature vector as the third real input; and
- wherein, when, generating the imaginary input portion of the input to the dual-attention component of the machine learning model, the at least one processor is programmed or configured to:
  - provide the output of the one-dimensional feature extraction convolutional layer for the combined imaginary part of the first plurality of features as an input to the dropout layer to generate an imaginary contemporary transaction metric feature vector as the first imaginary input;
  - provide the output of the one-dimensional feature extraction convolutional layer for the combined imaginary part of the second plurality of features as an input to the dropout layer to generate an imaginary historical transaction metric feature vector as the second imaginary input; and
  - provide the output of the one-dimensional feature extraction convolutional layer for the combined imaginary part of the third plurality of features as an input to the dropout layer to generate an imaginary historical target transaction metric feature vector as the third imaginary input.

5. The system of claim 4, wherein, when generating the real component attention matrix, the at least one processor is programmed or configured to:
- generate a dot product of the real contemporary transaction metric feature vector and the real historical transaction metric feature vector;
- provide the dot product of the real contemporary transaction metric feature vector and the real historical transaction metric feature vector as an input to a softmax layer to generate a real attention feature vector; and
- generate a dot product of the real attention feature vector and the real historical target transaction metric feature vector to generate the real component attention matrix;
- wherein, when generating the imaginary component attention matrix, the at least one processor is programmed or configured to:
- generate a dot product of the imaginary contemporary transaction metric feature vector and the imaginary historical transaction metric feature vector;
- provide the dot product of the imaginary contemporary transaction metric feature vector and the imaginary historical transaction metric feature vector as a input to a softmax layer to generate an imaginary attention feature vector; and
- generate a dot product of the imaginary attention feature vector and the imaginary historical target transaction metric feature vector to generate the imaginary component attention matrix.

6. A method, comprising:
- receiving, with at least one processor, a time series of historical data points, wherein the historical data points include values of a plurality of transaction features with regard to a plurality of time intervals during an initial time period;
- determining, with at least one processor, a first time series of data points associated with a historical transaction metric and a second time series of data points associated with a historical target transaction metric from a historical time period, wherein the historical time period comprises a first time period of the initial time period;
- determining, with at least one processor, a third time series of data points associated with a contemporary transaction metric from a contemporary time period, wherein the contemporary time period comprises a second time period of the initial time period that is after the historical time period, and wherein the historical time period is longer than the contemporary time period; and
- training, with at least one processor, a machine learning model, wherein the machine learning model is configured to provide an output that comprises a predicted time series of data points associated with a contemporary target transaction metric, wherein the contemporary target transaction metric comprises a value of a target transaction metric during a targeted prediction period, and wherein training the machine learning model comprises:
  - generating an output of the machine learning model, wherein the output of the machine learning model comprises the contemporary target transaction metric, and wherein the contemporary target transaction metric comprises a value of a target transaction metric during a targeted prediction period;
  - providing the first time series of data points, the second time series of data points, and the third time series of data points as inputs to a processing layer of the machine learning model, wherein the processing layer comprises a fast Fourier transform (FFT) layer;
  - providing an output of the processing layer as an input to a feature extraction component of the machine learning model;
  - providing an output of the feature extraction component of the machine learning model as an input to a dual-attention component of the machine learning model; and
  - providing an output of the dual-attention component of the machine learning model as an input to a learning and prediction component of the machine learning model, wherein providing the first time series of data points, the second time series of data points, and the third time series of data points inputs to the processing layer of the machine learning model comprises:
   providing each feature of a first plurality of features of the first time series of data points associated with the historical transaction metric as an input to the FFT layer to generate a real part and an imaginary part for each feature of the first plurality of features;
   providing each feature of a second plurality of features of the second time series of data points associated with the historical target transaction metric as an input to the FFT layer to generate a real part and an imaginary part for each feature of the second plurality of features; and
   providing each feature of a third plurality of features of the third time series of data points associated with the contemporary transaction metric as an input to the FFT layer to generate a real part and an imaginary part for each feature of the third plurality of features;
   combining the real part for each feature of the first plurality of features to generate a combined real part of the first plurality of features;
   combining the imaginary part for each feature of the first plurality of features to generate a combined imaginary part of the first plurality of features;
   combining the real part for each feature of the second plurality of features to generate a combined real part of the second plurality of features;
   combining the imaginary part for each feature of the second plurality of features to generate a combined imaginary part of the second plurality of features;
   combining the real part for each feature of the third plurality of features to generate a combined real part of the third plurality of features; and
   combining the imaginary part for each feature of the third plurality of features to generate a combined imaginary part of the third plurality of features; and
   wherein the output of the processing layer of the machine learning model comprises the combined real part of the first plurality of features, the combined imaginary part of the first plurality of features, the combined real part of the second plurality of features, the combined imaginary part of the second plurality of features, the combined real part of the third plurality of features, and the combined imaginary part of the third plurality of features.

7. The method of claim 6, wherein training the machine learning model comprises:
   providing the combined real part of the first plurality of features as an input to a one-dimensional feature extraction convolutional layer;
   providing the combined imaginary part of the first plurality of features as an input to the one-dimensional feature extraction convolutional layer;
   providing the combined real part of the second plurality of features as an input to the one-dimensional feature extraction convolutional layer;
   providing the combined imaginary part of the second plurality of features as an input to the one-dimensional feature extraction convolutional layer;
   providing the combined real part of the third plurality of features as an input to the one-dimensional feature extraction convolutional layer;
   providing the combined imaginary part of the third plurality of features as an input to the one-dimensional feature extraction convolutional layer; and
   generating the output of the feature extraction component of the machine learning model based on an output of the one-dimensional feature extraction convolutional layer.

8. The method of claim 7, wherein the input to the dual-attention component of the machine learning model comprises a real input portion and an imaginary input portion,
   wherein the real input portion comprises:
      a first real input based on an output of the one-dimensional feature extraction convolutional layer for the combined real part of the first plurality of features;
      a second real input based on an output of the one-dimensional feature extraction convolutional layer for the combined real part of the second plurality of features; and
      a third real input based on an output of the one-dimensional feature extraction convolutional layer for the combined real part of the third plurality of features; and
   wherein the imaginary input portion comprises:
      a first imaginary input based on an output of the one-dimensional feature extraction convolutional layer for the combined imaginary part of the first plurality of features;
      a second imaginary input based on an output of the one-dimensional feature extraction convolutional layer for the combined imaginary part of the second plurality of features; and
      a third imaginary input based on an output of the one-dimensional feature extraction convolutional layer for the combined imaginary part of the third plurality of features; and
   wherein training the machine learning model comprises:
      generating a real component attention matrix based on the real input portion, wherein the real component attention matrix has a number of attention vectors that is equal to a number of features of the plurality of transaction features; and
      generating an imaginary component attention matrix based on the imaginary input portion, wherein the imaginary component attention matrix has a number of attention vectors that is equal to a number of features of the plurality of transaction features.

9. The method of claim 8, wherein the method further comprises:
   generating the real input portion of the input to the dual-attention component of the machine learning model; and
   generating the imaginary input portion of the input to the dual-attention component of the machine learning model;
   wherein generating the real input portion of the input to the dual-attention component of the machine learning model comprises:
      providing the output of the one-dimensional feature extraction convolutional layer for the combined real part of the first plurality of features as an input to a dropout layer to generate a real contemporary transaction metric feature vector as the first real input;
      providing the output of the one-dimensional feature extraction convolutional layer for the combined real part of the second plurality of features as an input to the dropout layer to generate a real historical transaction metric feature vector as the second real input; and providing the output of the one-dimensional feature extraction convolutional layer for the combined real part of the third plurality of features as an input to the dropout layer to generate a real historical target transaction metric feature vector as the third real input; and wherein generating the imaginary input portion of the input to the dual-attention component of the machine learning model comprises:

providing the output of the one-dimensional feature extraction convolutional layer for the combined imaginary part of the first plurality of features as an input to the dropout layer to generate an imaginary contemporary transaction metric feature vector as the first imaginary input;

providing the output of the one-dimensional feature extraction convolutional layer for the combined imaginary part of the second plurality of features as an input to the dropout layer to generate an imaginary historical transaction metric feature vector as the second imaginary input; and providing the output of the one-dimensional feature extraction convolutional layer for the combined imaginary part of the third plurality of features as an input to the dropout layer to generate an imaginary historical target transaction metric feature vector as the third imaginary input.

10. The method of claim 9, wherein generating the real component attention matrix comprises:

generating a dot product of a real contemporary transaction metric feature vector and the real historical transaction metric feature vector;

providing the dot product of the real contemporary transaction metric feature vector and the real historical transaction metric feature vector as an input to a softmax layer to generate a real attention feature vector; and generating a dot product of the real attention feature vector and the real historical target transaction metric feature vector to generate the real component attention matrix;

wherein generating the imaginary component attention matrix comprises:

generating a dot product of the imaginary contemporary transaction metric feature vector and the imaginary historical transaction metric feature vector;

providing the dot product of the imaginary contemporary transaction metric feature vector and the imaginary historical transaction metric feature vector as a input to a softmax layer to generate an imaginary attention feature vector; and generating a dot product of the imaginary attention feature vector and the imaginary historical target transaction metric feature vector to generate the imaginary component attention matrix.

11. A computer program product comprising at least one non-transitory computer-readable medium including one or more instructions that, when executed by at least one processor, cause the at least one processor to:

receive a time series of historical data points, wherein the historical data points include values of a plurality of transaction features with regard to a plurality of time intervals during an initial time period;

determine a first time series of data points associated with a historical transaction metric and a second time series of data points associated with a historical target transaction metric from a historical time period, wherein the historical time period comprises a first time period of the initial time period;

determine a third time series of data points associated with a contemporary transaction metric from a contemporary time period, wherein the contemporary time period comprises a second time period of the initial time period that is after the historical time period, and wherein the historical time period is longer than the contemporary time period; and train a machine learning model, wherein the machine learning model is configured to provide an output that comprises a predicted time series of data points associated with a contemporary target transaction metric, wherein the contemporary target transaction metric comprises a value of a target transaction metric during a targeted prediction period, and wherein, the one or more instructions that cause the at least one processor to train the machine learning model, cause the at least one processor to:

generate an output of the machine learning model, wherein the output of the machine learning model comprises the contemporary target transaction metric, and wherein the contemporary target transaction metric comprises a value of a target transaction metric during a targeted prediction period;

provide the first time series of data points, the second time series of data points, and the third time series of data points as inputs to a processing layer of the machine learning model, wherein the processing layer comprises a fast Fourier transform (FFT) layer;

provide an output of the processing layer as an input to a feature extraction component of the machine learning model;

provide an output of the feature extraction component of the machine learning model as an input to a dual-attention component of the machine learning model; and provide an output of the dual-attention component of the machine learning model as an input to a learning and prediction component of the machine learning model, wherein, the one or more instructions that cause the at least one processor to provide the first time series of data points, the second time series of data points, and the third time series of data points as inputs to the processing layer of the machine learning model, cause the at least one processor to:

provide each feature of a first plurality of features of the first time series of data points associated with the historical transaction metric as an input to the FFT layer to generate a real part and an imaginary part for each feature of the first plurality of features;

provide each feature of a second plurality of features of the second time series of data points associated with the historical target transaction metric as an input to the FFT layer to generate a real part and an imaginary part for each feature of the second plurality of features; and provide each feature of a third plurality of features of the third time series of data points associated with the contemporary transaction metric as an input to the FFT layer to generate a real part and an imaginary part for each feature of the third plurality of features;

combine the real part for each feature of the first plurality of features to generate a combined real part of the first plurality of features;

combine the imaginary part for each feature of the first plurality of features to generate a combined imaginary part of the first plurality of features;

combine the real part for each feature of the second plurality of features to generate a combined real part of the second plurality of features;

combine the imaginary part for each feature of the second plurality of features to generate a combined imaginary part of the second plurality of features:

combine the real part for each feature of the third plurality of features to generate a combined real part of the third plurality of features; and combine the imaginary part for each feature of the third plurality of features to generate a combined imaginary part of the third plurality of features, and wherein the output of the processing layer of the machine learning model comprises the combined real part of the first plurality of features, the combined imaginary part of the first plurality of features, the combined real part of the second plurality of features, the combined imaginary part of the second plurality of features, the combined real part of the third plurality of features, and the combined imaginary part of the third plurality of features.

12. The computer program product of claim 11, wherein, the one or more instructions that cause the at least one processor to train the machine learning model, cause the at least one processor to:

provide the combined real part of the first plurality of features as an input to a one-dimensional feature extraction convolutional layer;

provide the combined imaginary part of the first plurality of features as an input to the one-dimensional feature extraction convolutional layer;

provide the combined real part of the second plurality of features as an input to the one-dimensional feature extraction convolutional layer;

provide the combined imaginary part of the second plurality of features as an input to the one-dimensional feature extraction convolutional layer;

provide the combined real part of the third plurality of features as an input to the one-dimensional feature extraction convolutional layer;

provide the combined imaginary part of the third plurality of features as an input to the one-dimensional feature extraction convolutional layer; and generate the output of the feature extraction component of the machine learning model based on an output of the one-dimensional feature extraction convolutional layer.

13. The computer program product of claim 12, wherein the input to the dual-attention component of the machine learning model comprises a real input portion and an imaginary input portion, wherein the real input portion comprises:
a first real input based on an output of the one-dimensional feature extraction convolutional layer for the combined real part of the first plurality of features;

a second real input based on an output of the one-dimensional feature extraction convolutional layer for the combined real part of the second plurality of features; and a third real input based on an output of the one-dimensional feature extraction convolutional layer for the combined real part of the third plurality of features; and wherein the imaginary input portion comprises:
a first imaginary input based on an output of the one-dimensional feature extraction convolutional layer for the combined imaginary part of the first plurality of features;

a second imaginary input based on an output of the one-dimensional feature extraction convolutional layer for the combined imaginary part of the second plurality of features; and a third imaginary input based on an output of the one-dimensional feature extraction convolutional layer for the combined imaginary part of the third plurality of features; and wherein, the one or more instructions that cause the at least one processor to train the machine learning model, cause the at least one processor to:

generate a real component attention matrix based on the real input portion, wherein the real component attention matrix has a number of attention vectors that is equal to a number of features of the plurality of transaction features; and generate an imaginary component attention matrix based on the imaginary input portion, wherein the imaginary component attention matrix has a number of attention vectors that is equal to a number of features of the plurality of transaction features.

14. The computer program product of claim 13, wherein the one or more instructions further cause the at least one processor to:

generate the real input portion of the input to the dual-attention component of the machine learning model; and generate the imaginary input portion of the input to the dual-attention component of the machine learning model;

wherein, the one or more instructions that cause the at least one processor to generate the real input portion of the input to the dual-attention component of the machine learning model, cause the at least one processor to:

provide the output of the one-dimensional feature extraction convolutional layer for the combined real part of the first plurality of features as an input to a dropout layer to generate a real contemporary transaction metric feature vector as the first real input;

provide the output of the one-dimensional feature extraction convolutional layer for the combined real part of the second plurality of features as an input to the dropout layer to generate a real historical transaction metric feature vector as the second real input; and provide the output of the one-dimensional feature extraction convolutional layer for the combined real part of the third plurality of features as an input to the dropout layer to generate a real historical target transaction metric feature vector as the third real input; and wherein, the one or more instructions that cause the at least one processor to generate the imaginary input portion of the input to the dual-attention component of the machine learning model, cause the at least one processor to:

provide the output of the one-dimensional feature extraction convolutional layer for the combined imaginary part of the first plurality of features as an input to the dropout layer to generate an imaginary contemporary transaction metric feature vector as the first imaginary input;

provide the output of the one-dimensional feature extraction convolutional layer for the combined imaginary part of the second plurality of features as an input to the dropout layer to generate an imaginary historical transaction metric feature vector as the second imaginary input; and provide the output of the one-dimensional feature extraction convolutional layer for the combined imaginary part of the third plurality of features as an input to the dropout layer to generate an imaginary historical target transaction metric feature vector as the third imaginary input.

\* \* \* \* \*

UNITED STATES PATENT AND TRADEMARK OFFICE
CERTIFICATE OF CORRECTION

PATENT NO. : 11,922,290 B2
APPLICATION NO. : 17/919898
DATED : March 5, 2024
INVENTOR(S) : Zhongfang Zhuang et al.

It is certified that error appears in the above-identified patent and that said Letters Patent is hereby corrected as shown below:

In the Claims

Column 43, Line 47, Claim 1, delete "features:" and insert -- features; --

Column 47, Line 3, Claim 6, delete "inputs" and insert -- as inputs --

Column 51, Line 16, Claim 11, delete "features:" and insert -- features; --

Signed and Sealed this
Thirtieth Day of April, 2024

Katherine Kelly Vidal
*Director of the United States Patent and Trademark Office*